United States Patent
Glass et al.

(10) Patent No.: US 6,718,263 B1
(45) Date of Patent: Apr. 6, 2004

(54) TRAVEL TRACKER NETWORK SYSTEM

(75) Inventors: Paul M. Glass, Sugar Land, TX (US); Charles M. Wohl, The Woodlands, TX (US); Susan M. Kight, Houston, TX (US); Eddie R. McMullen, Houston, TX (US); Alan L. Hammond, Houston, TX (US)

(73) Assignee: Advanced Tracking Technologies, Inc., Houston, TX (US)

( * ) Notice: Subject to any disclaimer, the term of this patent is extended or adjusted under 35 U.S.C. 154(b) by 90 days.

(21) Appl. No.: 09/860,017

(22) Filed: May 17, 2001

Related U.S. Application Data

(63) Continuation-in-part of application No. 09/748,886, filed on Dec. 27, 2000.

(51) Int. Cl.$^7$ .............................. H04M 1/24; H04M 3/08
(52) U.S. Cl. .................... 701/213; 379/59; 455/33.1; 455/53.1; 455/54.1; 455/56.1; 455/428; 455/432
(58) Field of Search .................. 701/213, 201, 701/202; 379/22, 5, 6, 58, 59, 60; 370/242, 247; 340/439, 539; 246/220, 226, 233; 455/456, 457, 33.1, 33.2, 428, 433, 432, 53.1, 54.1, 56.1

(56) References Cited

U.S. PATENT DOCUMENTS

| | | | |
|---|---|---|---|
| 5,432,841 A | * 7/1995 | Rimer | ......................... 379/59 |
| 5,572,528 A | 11/1996 | Shuen | ......................... 370/402 |
| 5,694,322 A | 12/1997 | Westerlage et al. | ......... 705/417 |
| 5,719,771 A | * 2/1998 | Buck et al. | ................. 340/438 |
| 5,748,148 A | 5/1998 | Heiser et al. | ................ 342/457 |
| 5,815,071 A | * 9/1998 | Doyle | ......................... 340/439 |
| 5,905,461 A | 5/1999 | Neher | ................... 342/357.07 |
| 6,072,429 A | 6/2000 | Crothall et al. | ........... 342/357.1 |
| 6,087,965 A | 7/2000 | Murphy | ....................... 340/991 |
| 6,088,650 A | 7/2000 | Schipper et al. | ............. 701/207 |
| 6,138,072 A | 10/2000 | Nagai | .......................... 701/207 |
| 6,141,609 A | 10/2000 | Herdeg et al. | ................. 701/35 |
| 6,141,610 A | 10/2000 | Rothert et al. | ................. 701/35 |
| 6,144,916 A | 11/2000 | Wood, Jr. et al. | ............ 701/200 |
| 6,154,152 A | * 11/2000 | Ito | .............................. 340/988 |
| 6,195,415 B1 | * 2/2001 | Shimoda et al. | .............. 379/22 |
| 6,278,936 B1 | * 8/2001 | Jones | .......................... 701/201 |
| 6,292,743 B1 | * 9/2001 | Pu et al. | ..................... 701/202 |
| 6,333,703 B1 | * 12/2001 | Alewine et al. | ............ 340/995 |
| 6,362,730 B2 | * 3/2002 | Razavi et al. | ................ 340/438 |
| 6,370,449 B1 | * 4/2002 | Razavi et al. | ................... 701/1 |

* cited by examiner

*Primary Examiner*—Thomas G. Black
*Assistant Examiner*—Tuan C To
(74) *Attorney, Agent, or Firm*—Rick Martin; Patent Law Offices of Rick Martin, P.C.

(57) ABSTRACT

The present invention utilizes a combination of local area networks and hard-wired wide area networks which communicate with mobile units wirelessly. An alternate embodiment uses a hard wired communication from a mobile unit to a base computer. The wireless local area network is comprised of a base computer unit connected wirelessly to single or multiple mobile units while also being connected to a hard-wired wide area network (such as the internet). The base unit either stores or routes packet data to a wide area network super router that, in turn, routes packets to the base unit computer where the packet data should ultimately reside. The present invention utilizes integrated software and hardware apparatus to identify, track and report tax-deductible vehicle travel routes including actual mileage, stops and routes driven.

43 Claims, 21 Drawing Sheets

516 — DAILY TRAVEL REPORT — TIME INTERVAL: 1 MINUTE(S)
502 — PAUL GLASS — 501
(FRIDAY OCTOBER 06, 2000)
(UNKNOWN)
503 — TOTAL TAX DEDUCTIBLE MILEAGE TO/FROM/MARK-TAX-DEDUCTIBLE:62.26

| START TIME (504) | STOP TIME (505) | TIME DURATION (506) | ACTION TYPE (507) | TAX DED. (511) | LOCATION NAME (508) | MILEAGE (509) | DED. MILEAGE (510) |
|---|---|---|---|---|---|---|---|
| 11:21AM | 11:21AM | 00:00 | POWER | | POWER ON | 0.00 | |
| 11:21AM | 11:21AM | 00:00 | BEGIN | | BEGIN:U-UNKNOWN | 0.00 | |
| 11:21AM | 11:21AM | 00:00 | IN TRANSIT | | IN TRANSIT | 0.23 | |
| 11:21AM | 11:29AM | 00:08 | STOP | | L-WHATABURGER AT 59 | 0.00 | |
| 11:30AM | 11:31AM | 00:01 | IN TRANSIT | | IN TRANSIT | 13.50 | |
| 11:31AM | 11:31AM | 00:00 | POWER | | POWER OFF | 0.00 | |
| 11:31AM | 5:15PM | 05:44 | STOP | Y | L-HOME OFFICE | 0.00 | 13.50 |
| 5:15PM | 5:15PM | 00:00 | POWER | | POWER ON | 0.00 | |
| 5:15PM | 5:19PM | 00:04 | IN TRANSIT | | IN TRANSIT | 2.81 | |
| 5:19PM | 5:20PM | 00:01 | STOP | | US HWY 90A | 0.00 | 2.81 |
| 5:20PM | 5:24PM | 00:04 | IN TRANSIT | | IN TRANSIT | 2.25 | |
| 5:24PM | 5:26PM | 00:02 | STOP | | DAIRY ASHFORD RD/STATE 41 | 0.00 | |
| 5:26PM | 5:42PM | 00:16 | IN TRANSIT | | IN TRANSIT | 17.42 | |
| 5:42PM | 6:42PM | 00:60 | STOP | Y | L-RESTAURANT | 0.00 | 17.42 |
| 6:42PM | 6:43PM | 00:01 | IN TRANSIT | | IN TRANSIT | 0.57 | |
| 6:43PM | 11:05PM | 04:22 | STOP | Y | L-HOUSTON ASTRODOME | 0.00 | 0.57 |
| 11:06PM | 11:34PM | 00:28 | IN TRANSIT | | IN TRANSIT | 27.96 | |
| 11:34PM | 11:34PM | ---- | END | | END:22-49 HARBORVIEW DR. | 0.00 | 27.96 |
| 11:34PM | 11:34PM | 00:00 | POWER | | POWER OFF | 0.00 | |

MEMO (WHERE A MEMO IS ENTERED) — 512
514 — TAX DEDUCTIBLE MILEAGE: 62.26
515 — NONTAX DEDUCTIBLE MILEAGE: 2.48

DAILY TOTALS: — 513

| # OF STOPS | 6 | # OF TRANSIT ROUTES: | 7 | TOTAL MILEAGE: | 64.74 |
|---|---|---|---|---|---|
| TIME AT STOPS | 11:17 | TIME IN TRANSIT: | 00:54 | AVE. MILEAGE: | 9.25 |
| AVERAGE TIME | 01:52 | AVERAGE TIME: | 00:07 | TOTAL ACCRUED TIME: | 12.54/1 |
| % OF TOTAL TIME | 92.61% | % OF TOTAL TIME | 7.39% | TIME USAGE RATIO: | 12:11 |

FIG.5

○TravelEyes 2     _ ☐ X
FILE MAP TRACK PINPOINT UNIT TOOLS HELP    [STOP #1 ▽] ☑SPEEDBAR [<1000 FT ▽]

SPEED LEGEND MPH      ☒

DEDUCTIBLE MILEAGE DETAIL
520

DRIVER NAME: f      TOTAL DEDUCTIBLE MILEAGE
PROCESSING DATE: 12/17/2000    TO/FROM/BETWEEN/NON-TAX/
VEHICLE NAME: UNKNOWN     TAX DED./UNMARK STOP: (6.71)

| | START TIME | STOP TIME | TIME DURATION | ACTION TYPE | TAX DED. | LOCATION NAME | MILEAGE | DED. MILEA |
|---|---|---|---|---|---|---|---|---|
| ☐ | 5:40PM | 5:40PM | 0 MIN | BEGIN | N | BEGIN:U-UNKNOWN | 0.00 | |
| ☐ | 5:40PM | 5:41PM | 1 MIN | IN TRANSIT | N | IN TRANSIT | 0.10 | |
| ☑ | 5:41PM | 5:43PM | 2 MIN | STOP | N | 4100-4299 CUSTER CRK | 0.00 | 0.10 |
| ☐ | 5:44PM | 5:46PM | 2 MIN | IN TRANSIT | N | IN TRANSIT | 1.09 | |
| ☑ | 5:46PM | 5:47PM | 1 MIN | STOP | N | UNKNOWN | 0.00 | 1.09 |
| ☐ | 5:48PM | 5:50PM | 2 MIN | IN TRANSIT | N | IN TRANSIT | 1.50 | |
| ☑ | 5:50PM | 5:51PM | 1 MIN | STOP | N | UNKNOWN | 0.00 | 1.50 |
| ☐ | 5:51PM | 5:52PM | 1 MIN | IN TRANSIT | N | IN TRANSIT | 0.65 | |
| ☑ | 5:52PM | 5:53PM | 1 MIN | STOP | Y | L-POST OFFICE | 0.00 | 0.65 |
| ☐ | 5:53PM | 5:53PM | 0 MIN | IN TRANSIT | N | IN TRANSIT | 0.12 | |
| ☑ | 5:53PM | 6:50PM | 1HR 57MIN | STOP | Y | L-RANDLES | 0.00 | 0.12 |
| ☐ | 6:50PM | 6:50PM | 0 MIN | IN TRANSIT | N | IN TRANSIT | 0.10 | |
| ☑ | 6:50PM | 6:51PM | 1 MIN | STOP | N | 2500-2533 WILLIAMS TRC | 0.00 | 0.10 |
| ☐ | 6:52PM | 6:58PM | 6 MIN | IN TRANSIT | N | IN TRANSIT | 3.15 | |
| ☑ | 6:58PM | 6:58PM | 0 MIN | END | N | END: L-MAIL BOX | 0.00 | 3.15 |

521 — (row 5:41PM STOP)
522 — (row 5:46PM STOP)
523 — (row 5:50PM STOP)
524 — (row 5:52PM STOP)
525 — (row 5:53PM STOP)
526 — (row 6:50PM STOP)
527 — (row 6:58PM END)

[ADD MEMO] [PRINT] [CANCEL]

⊞START

FIG.6A

| | DAILY TRAVEL REPORT | | | | | TIME INTERVAL: 1 MINUTE(S) | |
|---|---|---|---|---|---|---|---|

605 — SUNDAY DECEMBER 17, 2000    601 (f)
602 — UNKNOWN

TOTAL TAX DEDUCTIBLE MILEAGE TO/FROM/BETWEEN MARK-NO-TAX/ MARK-TAX-DEDUCTIBLE/UN-MARK LOCATION: 6.71

| START TIME | STOP TIME | TIME DURATION | ACTION TYPE | TAX DED. | LOCATION NAME | MILEAGE | DED. MILEAGE |
|---|---|---|---|---|---|---|---|
| 5:40PM | 5:40PM | 00:00 | POWER | | POWER ON | 0.00 | |
| 5:40PM | 5:40PM | 00:00 | BEGIN | | BEGIN:U-UNKNOWN | 0.00 | |
| 5:40PM | 5:41PM | 00:01 | IN TRANSIT | | IN TRANSIT | 0.10 | |
| 5:41PM | 5:43PM | 00:02 | STOP | | 4100-4299 CUSTER CR DR | 0.00 | 0.10 |
| 5:44PM | 5:46PM | 00:02 | IN TRANSIT | | IN TRANSIT | 1.09 | |
| 5:46PM | 5:47PM | 00:01 | STOP | | UNKNOWN | 0.00 | 1.09 |
| 5:48PM | 5:50PM | 00:02 | IN TRANSIT | | IN TRANSIT | 1.50 | |
| 5:50PM | 5:51PM | 00:01 | STOP | | UNKNOWN | 0.00 | 1.50 |
| 5:51PM | 5:52PM | 00:01 | IN TRANSIT | | IN TRANSIT | 0.65 | |
| 5:52PM | 5:53PM | 00:01 | STOP | Y | L-POST OFFICE | 0.00 | 0.65 |
| 5:53PM | 5:53PM | 00:00 | POWER | | POWER OFF | 0.00 | |
| 5:53PM | 5:53PM | 00:00 | IN TRANSIT | | IN TRANSIT | 0.12 | |
| 5:53PM | 6:50PM | 00:57 | STOP | Y | L-RANDLES | 0.00 | 0.12 |
| 6:50PM | 6:50PM | 00:00 | POWER | | POWER ON | 0.00 | |
| 6:50PM | 6:50PM | 00:00 | IN TRANSIT | | IN TRANSIT | 0.10 | |
| 6:50PM | 6:51PM | 00:01 | STOP | | 2500-2533 WILLIAMS TRACE | 0.00 | 0.10 |
| 6:52PM | 6:58PM | 00:06 | IN TRANSIT | | IN TRANSIT | 3.15 | |
| 6:58PM | 6:58PM | ---- | END | | END: L-MAIL BOX | 0.00 | 3.15 |
| 6:58PM | 6:58PM | 00:00 | POWER | | POWER OFF | 0.00 | |

603 — TAX DEDUCTIBLE MILEAGE: 6.71
604 — NONTAX DEDUCTIBLE MILEAGE: 0.00

DAILY TOTALS: 606

| # OF STOPS | 6 | # OF TRANSIT ROUTES: | 7 | TOTAL MILEAGE: | 6.70 |
|---|---|---|---|---|---|
| TIME AT STOPS | 01:03 | TIME IN TRANSIT: | 00:12 | AVE. MILEAGE: | 0.96 |
| AVERAGE TIME | 00:10 | AVERAGE TIME: | 00:01 | TOTAL ACCRUED TIME: | 5.25/1 |
| % OF TOTAL TIME | 84.00% | % OF TOTAL TIME | 16.0% | TIME USAGE RATIO: | 01:15 |

FIG.6C

TRAVEL TRACKER NETWORK SYSTEM

CROSS-REFERENCE TO RELATED APPLICATION

This application is a continuation in part claiming the benefits of U.S. application Ser. No. 09/748,886 filed Dec. 27, 2000.

FIELD OF THE INVENTION

The present invention relates to hardware and software to operate a wireless data network to verify, monitor and document vehicle travel activities and communicate instructions, messages and equipment status.

BACKGROUND OF THE INVENTION

Business operators, law enforcement, private detectives, parents and many other vehicle owners have reason to record the travel history, stop points, time-at-stop, mileage, speed history, and other related activities of individual vehicles. Computerized data gathering and reporting for a fleet of vehicles would lend itself to time and efficiency savings. For example, a company owned vehicle(s) used by an employee(s) for business and personal use would have some percentage of mileage that is tax deductible. The employee(s) would have to keep detailed records of each activity in order to categorize company versus personal usage. Manual time estimates, error, and trustworthiness can all be issues. The present invention provides a method for vehicle owners to know where their vehicles have been, showing total travel routes, rates of speed, concise mileage reports, stop times to the minute, tax deductible mileage for business use, etc. using today's GPS (Global Positioning System) technology. The invention further provides capability to monitor vehicle performance and operation such as idle speeds, compressor operation, refrigeration temperature, and even plow or grader position.

The Global Positioning System or "GPS" was developed by the U.S. Department of Defense as a worldwide navigation and positioning resource for both military and civilian use. It is based on a constellation of 24 satellites orbiting the earth over 20,000 km in altitude. These satellites act as reference points from which receivers on the ground "triangulate" their position.

By measuring the travel time of signals transmitted from the satellites, a GPS receiver can determine its distance from each satellite. By having distance measurements from four or more different satellites and some advanced mathematical equations known as a "Kalman filter", the receiver can calculate its latitude, longitude, altitude, speed and course traveled.

To make GPS even more accurate, some additional techniques have been developed. These techniques are known as Differential GPS or "DGPS". This method of DGPS yields position measurements good to a couple of meters.

Differential GPS works by canceling out some of the natural and man-made errors found within normal GPS measurements. These include clock errors within the satellites, and the delays induced by their travel through the earth's atmosphere. These errors are resolved by introducing differential corrections from a ground based reference station that calculates the corrections needed for the induced errors.

Use of GPS technology is a basis of gathering data for positioning, stops, travel speed, distance between coordinates etc.

The present invention provides integrated software and hardware apparatus to verify approved stops, actual mileage, routes, inventory usage, speed of vehicle recording, and other informational data. The software can be provided for local or wide area networking using client and server computer platforms. Use of wireless mobile unit transmission or direct PC download can be incorporated by the end user(s) depending on scale of operation requirements.

In order to best view the advantages of the present invention a summary of the most relevant prior art follows below.

SUMMARY OF THE PRIOR ART

U.S. Pat. No. 6,141,610 (2000) to Rothert, et al. discloses a vehicle operation method and apparatus for monitoring usage and condition of a vehicle including mileage, gas used, collision damage, area of operation, time of usage.

U.S. Pat. No. 6,141,609 (2000) to Herdeg, et al. discloses a method of collecting a vehicle itinerary determining the length of travel, time of travel, and the routing as in a trip journal and determine who drove the vehicle.

U.S. Pat. No. 5,572,528 (1996) to Shuen discloses a method to provide continuous, transparent communication between a mobile node and primary, secondary or tertiary networks. Mobile nodes log-in with a home router that assigns a virtual address that does not change throughout the session.

U.S. Pat. No. 5,694,322 (1997) to Westerlage, et al. discloses a method for determining tax of a vehicle. It includes a positioning device operable to determine a plurality of vehicle positions along a route traveled by the vehicle. A memory stores geographic information defining a plurality of taxing regions through which the route of the vehicle passes. The object to determine the tax for the vehicle in at least one taxing region through which the route of the vehicle passes.

U.S. Pat. No. 5,748, 148 (1998) to Heiser, et al. discloses a positional information storage and retrieval system and method. It consists of a plurality of receiver/transmitter units and a processor unit. Coordinate information of receiver/transmitter units is received by the positional information unit and used in determining the positional information according to triangulation or other techniques embodied within the positional detection unit. Algorithms embodied within the processor unit generate, update and control access to a database of information relating to locations of the subjects within the operational environment over time.

U.S. Pat. No. 5,905,461 (1999) to Neher discloses a method utilizing a global positioning and tracking system for locating one of a person and/or item of property.

U.S. Pat. No. 6,144,916 (2000) to Wood, Jr., and et al. discloses a method and apparatus for a base station or interrogator station to monitor the itinerary of one or more vehicles or other movable assets.

U.S. Pat. No. 6,138,072 (2000) to Nagai discloses a navigation device for use in a vehicle which is capable of determining and displaying a current position of the vehicle on a road map indicated on a display screen via Internet communication means.

U.S. Pat. No. 6,072,429 (2000) to Crothall, et al. discloses an integrated position determination system and radio transceiver.

U.S. Pat. No. 6,088,650 (2000) to Schipper, et al. discloses a vehicle location system for monitoring location, speed, and odometer of a vehicle.

U.S. Pat. No. 6,087,965 (2000) to Murphy discloses a calibration means for a vehicle mileage meter or taximeter.

What is needed is a method to integrate collected vehicle mileage, speed, stop, route and time information with software and wide area networking that provides detailed documentation on all vehicle activities including use for tax deductible mileage and/or for reimbursement for vehicle use.

The present invention meets these needs and more. The present invention can provide a color-coded speed history map and driver data entry records for inventory control.

SUMMARY OF THE INVENTION

The main aspect of the present invention is to provide integrated software and apparatus for local and wide area networking, collection and reporting of data concerning mileage and vehicle use for tax purposes.

Another aspect of the present invention is to combine wireless local area network and a hard-wired wide area network, which communicates with mobile units wirelessly.

Another aspect of the present invention is to provide a wireless local area network comprised of a base unit connected wirelessly to single or multiple mobile units while being hard-wired to a wide area network. Wherein the base unit either stores or routes packet data downloaded depending on the destination of packet data and based on wide area network connectivity.

Another aspect of the present invention is to allow a specific mobile unit(s) to roam from a pre-assigned base to another base unit(s) area(s) while transmitting/receiving information to/from the specific mobile units assigned base unit.

Another aspect of the present invention is to provide a wide area network wherein a super router routes packets to the proper base unit where the packet data should ultimately reside.

Another aspect of the present invention is to verify and document actual mileage, stops, and/or routes driven for use as documentation for tax-deductible mileage and/or for reimbursement of vehicle use.

Another aspect of the present invention is to provide mobile units with a processor, storage, wireless modem, serial communications, GPS connectivity, remote data entry, and software to allow wireless and direct PC connectivity to base units. Such mobile units have unique identifiers.

Another aspect of the present invention is to provide a base unit apparatus comprised of a processor unit, wireless modem and data storage.

Another aspect of the present invention is to provide colorized mapping data to show routes taken, speed indicia while in route and stops in route.

Another aspect of the present invention is to provide base unit software to store packet data until it can transmit it to the properly assigned base unit via the super router or until end users access the packet data directly.

Another aspect of the present invention is to provide wide area network super router software to store data until connections to proper base units can be established and packet data routed to the proper base unit.

Another aspect of the present invention is to provide mobile units capable of roaming from one base unit to other base units, each mobile unit having a unique identifier.

Another aspect of the present invention is to provide reports for tax and information purposes to show vehicle activity such as stops, stop times, routes, speeds, taxable mileage, miscellaneous mileage, etc., and be able to construct such reports in a variety of ways (by driver, by vehicle, by group, by date, etc.).

Another aspect of the present invention is to provide less expensive mobile units to communicate and store data and to connect directly to a base unit or PC for data transfer.

Another aspect of the present invention is to provide hardware and functional upgrades for mobile units.

Other aspects of this invention will appear from the following description and appended claims, reference being made to the accompanying drawings forming a part of this specification wherein like reference characters designate corresponding parts in the several views.

A. General Discussion of System

The present invention provides a combination wireless local area network and hard-wired wide area network, which communicates with mobile units wirelessly. The wireless local area network is comprised of a base unit connected wirelessly to a single or to multiple mobile units. The base unit is also connected to a hard-wired wide area network. A mobile unit contains firmware that will collect and transmit packet data to a base unit. Packet data will consist of detailed distance, location (longitude/latitude), time, speed and heading information. Depending on the ultimate destination of packet data, the receiving base unit will either locally store or route the packet data (data collected from a mobile unit) to a super router on the wide area network. If the packet data is to be routed to the wide area network and no connectivity exists, the receiving base unit will temporarily store the packet data locally. Once routed to the wide area network, a wide area network super routed will, in turn, route the packet data to the base unit where the packet data should ultimately reside. Base units store data until end users access the packet data. The wide area network super router stores data until connections with the proper base units can be made. When connectivity is established the packet data is properly routed to the proper base unit. Mobile units are capable of roaming from base unit to base unit. Each mobile unit has a unique identifier.

The overall wide area network system consists of mobile units, base units and a network super router.

Hardware setups will generally include two or more computers that are networked. One computer will act as a base unit or network server to handle administrative functions while the other computer(s) will act as workstations or clients.

B. System Components

The following is a description of the components of the network. The components are the mobile unit, the base unit and the super router.

1. Mobile Unit

The mobile unit is comprised of a processor, storage unit, wireless modem, GPS receiver and serial communications port. The mobile unit can communicate with devices such as equipment monitoring sensors, laptops, palmtop and other such devices. The mobile unit will either transmit on-demand or on a timed basis. The mobile unit can also receive data from a base unit. Mobile units all contain firmware with software to gather GPS data, store data and download into application software that provides detailed distance, location (longitude/latitude), time, speed, and heading information necessary to monitor the units and drivers. Information is collected in specific time intervals such as once every 10 seconds during the vehicles movement. Units can usually be mounted anywhere inside a vehicle. The antenna can be mounted such that it can receive satellite signals. Powering the mobile unit off for more than 16 hours may require up to 10 minutes when re-powered on to acquire a new and adequate GPS signal. If the unit(s) is left stationary for long periods of time there is a slight chance that data downloaded may appear as if the unit has wandered off for short distances.

This may be due to the DOD's procedure for selective availability or atmospheric conditions creating signal disturbances. Website www./aafb.af.mil/SMC/CZ/homepage will list dates and times of possible problems.

Mobile units can be permanently wired into a vehicle in the case of wireless transmission capability. Other units would provide a means to interface through standard 9-pin serial port connectors to connect to a base computer and transfer data.

The data collection rate of a mobile unit is the time interval in which the unit will collect and log a GPS coordinate, time and speed. Wireless units have specific collection rates that are not reset. However, non-wireless units can be set for a variety of settings with a default of 10 seconds. For example, they may be set to 3,7, 10, 15, 20, 30, 45, 60, 90, 120 seconds depending on end user activity requirements etc.

In a typical configuration the mobile unit will send a basic data packet every one minute when the unit has carrier detect. If the mobile unit does not have carrier detect for over one minute, the mobile unit will, upon getting carrier detect, send the basic data packet immediately and begin the one minute interval data send period from that time.

The initial communication data packet from the mobile unit to the base station will include:

Base unit identifier number to which the mobile unit is assigned,

Mobile unit identifier number,

Type of service available (roaming or non-roaming for historical, messaging or other types of services), Mobile signal strength, Mobile clock time (mobile clock adjusted to GPS time), Latitude, Longitude, Speed, Two-way communication required (if there is an attachment or additional data to follow), Motion, and Heading.

For initial communication of the data packet for paging and for two-way messaging only to the nearest base station the data packet will contain:

Unit identifier number,

Attach base unit identifier that communication was initiated through,

Attach base time to packet,

Forward data packet to super router.

The downloaded data from the mobile unit(s) is stored in the base computer to be accessed by the user for mapping the routes driven or to produce reports of stops, times and mileage's driven. Through the mapping software the user marks or identifies a tax-deductible location based either on an actual stop made or a physical location on a map by street address. Once the tax deductible location is identified, the user is allowed to choose if the mileage to or from that stop location from the last or next stop is to be considered tax deductible. The user is also allowed to include mileage between two tax-deductible locations as being tax deductible. Once the parameters are set, the software will automatically tabulate the tax deductible and non-deductible mileages and display the information on a grid style form. The user is then allowed to review which mileage they would like to add or subtract for additional stops for mileage to be included or not to be included in the final report. The user cannot change the total mileage for the day as calculated by the GPS route but only the proportion of deductible versus non-deductible mileage.

Mobile units can be configured in a variety of ways. Memory storage, motion detection without starting, more efficient current draw, direct PC connectivity vs. local vs. remote wireless connection, remote data entry are some examples that relate to the mobile unit configuration and cost.

In a higher cost configuration, a mobile unit may have increased memory, real-time remote monitor/tracking, wireless download of packet data to a base unit, built in motion detector, differential GPS readiness, switched power capabilities (only ON if vehicle is running for example). Other functions and features can include antennas for differential GPS corrections, permanent vehicle mount, driver data input etc. Among other functions driver input may consist of time clock entry, inventory used, product delivered, job costing, order administration, payroll, and billing.

In the simplest of systems, a mobile unit can collect data and be brought to a base unit (home PC) for collection and reporting of data directly. Download to the base unit can be accomplished by direct hard wire connection or by local wireless connection (infrared for example) or via a wireless radio transceiver. The client unit will contain the software to generate reports directly to the end user.

2. Base Unit

The base unit is comprised of a processor unit, a serial communications modem, a radio transceiver and a data storage unit. The end user configures the base unit with the mobile units that are assigned to the respective base unit. The base unit is where all remote/local data downloads occur. A base unit receives data packets from mobile unit(s) either through wireless or direct communications. Depending on the type of data, the base unit either acknowledges or passively receives information from mobile units. Each mobile unit has a unique identifier and each base unit has a unique identifier that is pre-defined. The base unit is configured with each mobile unit(s) unique identifier that is assigned to that base unit. The base unit retains a registry of all mobile units that are assigned to it. If the data received belongs to the receiving base unit, the data will be processed and held in storage for retrieval by either the end user direct commands or other outside commands from other devices such as computer servers or single computer clients via a serial or Ethernet data connection. If the data to be received from a mobile unit does not belong to the receiving base unit, the base unit determines if an Internet connection exists or does not exist. The base unit checks for an Internet connection on a timed or as-need-to basis. If no Internet connection exists, that mobile unit will not download data. If an Internet connection does exist, the information will be received by the base unit and then directly passed through the Internet to the super router. The packet data sent to the super router will include the mobile units unique identifier, the mobile units assigned base unit's unique identifier and the data. Upon power up and/or lost Internet connections, the base unit will automatically try to establish (re-establish) an Internet connection. Each base unit in a system has an encrypted code that establishes its validity to log in to the super router. Base units can be configured from the super router. The base unit operating firmware can be updated from the super router. Base units and their host computer contain working software for updating database, reporting, viewing tracks, customizing reporting formats etc. Mobile units can roam from base unit to base unit areas. Base units (Servers) use shared resources to network users (clients). Client stations access shared network resources provided by a server. Client stations contain working software for updating database, reporting, viewing tracks, customizing reporting formats etc.

Base units can send data to a mobile unit. The base unit will receive data through serial communications from the end user and determine if a direct wireless link with the mobile unit exists. If a wireless connection exists, the data will be transmitted to the mobile unit and the mobile unit will acknowledge receipt of the data. If a wireless connection between the mobile unit and the initiating base unit does not exist, the base unit will forward data to the super router through the Internet. If the Internet connection does not exist, the base unit will store the data until an Internet or wireless connection can be established.

Each base unit will maintain specific information regarding the network system. Each base unit will maintain but not be limited to at least the following information:

A. All mobile units specifically assigned to that specific base unit,

B. Whether or not that specific base unit has an Internet connection,

C. The unique base number assigned to that specific base unit. This base number cannot be altered, D. Four separate TCP-IP addresses prioritized based on connectivity. Addresses consist of one primary (which cannot be changed) and three secondary addresses with the second, third, and fourth address changeable, and E. A base specific password that is only accessible by the present invention service provider.

Other functions of base unit software acting as servers also perform functions such as:

Administrative user security setting, maintenance etc.

Extracting packet files from mobile units

Formatting incoming data files prior to processing

Processing incoming GPS packet data from mobile unit files into a common database Mobile unit profiles associated with that unit 3. Super Router The super router is controlled by the facility of the present invention. The super router retains a registry of all base units' unique identifiers and the relationship to mobile units. Base units will update the super router registry with each new mobile unit added or deleted. The super router maintains a registry of the base unit connections with the Internet. The super router maintains a registry of the last known communication of a mobile unit and the base unit it came from. The super router maintains a registry of all base encrypted codes. All registries are constantly updated based on the latest data or status.

Once data is received from individual base units, the super router will transmit that data to the proper base unit. If no Internet connection exists, the super router will store the received data until an Internet connection can be established with the base unit with which the data should reside. If an Internet connection exists, the super router will forward the data to the base unit for which the data should reside. If the base unit is the ultimate data destination the base unit will acknowledge receipt of the data before the super router archives the data. If the mobile unit is the ultimate data destination, the base unit will not acknowledge delivery of the data until the mobile unit acknowledges receipt of the data. All data that passes through the super router will be archived for access by end users.

The super router is configured to maintain pertinent information regarding the entire network. As such the super router will maintain but not be limited to the following:

A. A registry of all base units in the system,

B. A registry of all mobile units within the system,

C. A registry of internet connections regarding system base units,

D. A registry of the service provided to each individual customer,

E. If the billing is current or not current for the service being provided,

F. A registry of all base passwords and configurations, and

G. A registry of the last mobile communication and the base it last communicated through.

H. Geographic location of each base unit.

C. Network Overview

1. General Discussion:

With fully networked systems a mobile unit may be in the vicinity of its home base or may have roamed to another base unit. Depending on the type of data received by a base unit, the base unit either acknowledges or passively receives information from mobile units. Each mobile unit has a unique identifier, and each base unit has a unique identifier that is predefined to the system. The base unit is configured with each mobile unit's unique identifier for units that belong to the respective base unit. The base unit retains a registry of all mobile units that belong to that particular base unit. If the data sent from a mobile unit belongs to the receiving base unit, the data will be processed and held in storage for retrieval by either end user direct commands or other outside commands from other devices such as computer servers or single computer clients through a serial data connection. If the mobile unit does not belong to the base unit (for example, when a mobile unit has roamed outside it's home base and signals are received by another base unit), the receiving base unit determines if an Internet connection exists or not. The base unit checks for an Internet connection on a timed or as-need-to basis. If no Internet connection exists, that mobile unit will not download the data. If an Internet connection exists, the information will be received by the base unit (downloaded by the mobile unit) and then passed through the Internet to a super router. The packet data sent to the super router will include the mobile unit's unique identifier, the base unit unique identifier and the data. The super router will then determine if an Internet connection exists with the proper base unit. If an Internet connection exists, the data packet is forwarded to the base unit to which the mobile unit is assigned. The super router maintains a registry of all base units and relationships of base units to mobile units. If no Internet connection exists, the data is stored until an Internet connection can be established with the proper base unit. Base units will acknowledge receipt of data.

In the case of transmitting data to mobile units the base unit will receive data from the end user through serial communications or wirelessly through another mobile unit.

The base unit will then determine if a direct wireless link with the mobile unit exists. If a wireless connection currently exists, the data will be transmitted to the mobile unit and the mobile will acknowledge receipt of the data. If a wireless connection with the initiating base unit does not exist, the base unit will forward data to the super router through the Internet. If the Internet connection does not exist, the base unit will store the data until an Internet connection with the super router can be established.

2. Services Provided

Typical services provided including the type of data communication are (but not limited to) the following:

Mobile unit roaming (outside its assigned base units range),

Mobile unit messaging,

Internet viewing of "real-time" mobile unit tracking,

Historical and messaging storage,

Internet access messaging,

Restricted web browsing,

News service,

Weather service,

Traffic update service,

GPS vehicle location information (basic data packet),

Equipment or vehicle monitoring information (Temperatures, pressures, rpm, etc.), E-mail messaging (no attachments), E-mail messaging (with attachments), Inner network messaging (between mobile and base or between mobile and other mobile(s)), Text documents or files, Spreadsheet documents or files, and Paging messages (through base system or other paging networks).

3. Communication Standards

Typical standards for communications concerning the services as described above are as follows:

Area factors will determine the specifications on signal strength. Normally a higher signal strength requirement will be placed on vehicles with motion and a lower specification requirement with no motion. Factors such as terrain, traffic, transmission towers, average and maximum distance, etc. will be factored into the setting of the local specifications.

Sending small data messages (less than 150 bytes compressed) are allowed if any two-way communication can be established with motion or no motion, Sending medium size data messages (151 to 1000 bytes compressed) are allowed if any two-way communication can be established with no motion or if a signal strength is 80 or more with motion, Sending large size data messages (greater than 1000 bytes) are allowed if two-way communication can be established with a signal strength of 75 to 91 with no motion or if signal strength is 92 or more with or without motion.

4. Communication Paths

Typical communications can occur, either through the super router or not, between the following units:

From a computer (connected to a base) to a mobile unit,

From a computer (connected to a network) to a base and to a mobile unit,

From any Internet connection to a mobile,

From a mobile unit to another mobile unit,

From a mobile unit to a base connected to a computer or network of computers.

5. Registration Of Units

A. Base Unit Registration

Upon the purchase of a base unit, customer information such as name, billing and mailing address, phone number(s), fax number(s), e-mail address, contact name(s), etc. is collected. The purchaser (customer) will be given a unique registration number that is required in order to activate the newly procured base unit. The customer is then required to contact the administration office of the present invention to initiate communication through the network and will be required to supply the above information. Once registration is completed, the base unit identifier will be added to the active base units table that resides within the super router.

B. Registration of a New Mobile Unit

Upon purchase of a new mobile unit, the user is required to attach the unit to a computer that is capable of communicating with the specific base unit to which the mobile unit will be assigned. The user will enter the unique mobile unit serial number into an administrator screen. The computer will read the unique mobile unit serial number and compare it to the encrypted unique number which is stored internally on the attached base unit. If the serial numbers match, the mobile unit will retrieve the unique base serial number and store it internally. The base unit will also retrieve the unique mobile unit serial number and store it. Thus the specific base unit and mobile unit are logically coupled. That is, the specific mobile unit is now logically assigned to that specific base unit. Once the base registry of the base unit is updated for that specific mobile unit, the mobile unit can be used. The base unit updates a master table held by the service office of the present invention through the super router only in the event of a change in the base station mobile unit table.

D. Administrative Tasks

1. Server Related Tasks

Typical administrative tasks in setting up and maintaining a server would include but not be limited to:

Initial installation of base unit software

Setting up the administrator name/password for security reasons

Adding/deleting all user licenses

Periodically reviewing all user licenses

Adding/Deleting custom user groups

Adding/Deleting/Modifying user name(s) to group(s)

Setting user/group security rights such as common locations, branch information, inventory system, time tracking, vehicle issue, etc.

Modifying user name(s), other user information

Viewing all user/group names/information

2. Client Related Tasks

Typical administrative tasks in setting up and maintaining a client would include but not be limited to:

Installation of software

Setting administrative name/password

Establish communication to the server

Add data regarding company and related entities

Logging onto a viewport screen to monitor tracking data, run report(s), build database files, etc.

Clearing a locked user. For example, regaining user access for a user that exited from the system without first logging out Purging unused or old GPS data from the database Compacting and repairing database after each purge to optimize disk space utilization Backup of the database periodically to a backup directory or setting of automatic backup frequencies.

Handling download errors. For example, before records are added to the database they must be associated with a valid unit and current vehicle. If they do not qualify, they are handled as a download error.

Reviewing data map data to insure certain street level data is available for viewing. Down loading map data as required from the server.

3. Mobile (Tracking) Unit Tasks

Setting up individual tracking units would typically include but not be limited to:

Initially connecting mobile unit to computer open port to establish initial communication validation.

Input validation code for respective mobile unit. This would allow software to verify validity of unit and add unit to database.

Installation of the mobile unit into the respective vehicle. Once all mobile tracking units have been validated, the system is ready to start the GPS data collection process on the base unit or network server.

4. Processing Alternatives Discussion

Once the system is set up and running there are various processing alternatives for the end user. Historical file processing can run on a continual basis or at certain times. It is useful to run this processing at off-peak times so as not to interfere with real-time file processing. Historical files contain much more data than real-time files and thus take longer to process. Likewise, processing of real-time data on a continuous basis is not necessary if the end user is not using the real-time coordinates. Time settings for retrieval of real-time files are also available. The transmit rate of a mobile unit can also be set.

E. End User Reports Available

Many reports are made available to the end user. The analysis reports present GPS tracking data in a unique structure that is designed to present a certain effective viewpoint of tracking activity. Each duration of time identified as a stop is cross-referenced with the marked coordinates of the informational data such as common location, employee house, customer location, etc. A coordinate is considered to be a match if it is included within a pre-defined area of the mark (or target area). If the mobile unit is powered OFF, the time interval and the location of that event will be reported. Software is designed to identify stops by two separate means. One such means is a power failure or the mobile unit being powered OFF. The duration of a stop is calculated from the point of the power OFF (or failure) to the time the first coordinate is received from that mobile unit after the power OFF (or failure). Another such means is determined by the variation of two consecutive GPS coordinates. A particular mobile unit stop duration is then calculated from the first coordinate received that shows no motion until the first consecutive coordinate that shows motion.

Reports can originate as individual base unit entities or from multiple base units. For example, if a customer has multiple base units, each reporting over individual geographic areas, one base unit (or another computer) can act as a "master" or "home" unit for the customer. The "home" base unit can gain access to stored data on all other base units of that individual customer. Thus data can be assimilated from all customer base units and compiled into a full customer report(s). The following is an example listing of reports that can be accessed. Reports are not limited to those that follow. Other reports can be added or existing reports can be modified to specific end user requirements. Typical reports are:

Branch Information Listing: A report of selected branches to include name, address, phone numbers, etc.

Common Location Listing: A report of listings of common (fixed) locations. This report includes name, address, phone numbers etc.

Customer Data Sheet: Single customer information such as name, address, phone, contact name etc.

Customer Activity Report: Listing of customer activity records entered by the mobile unit(s) such as Job-In time, Job-Out time, date, etc.

Customer Inventory Transactions Report: Detail of inventory usage for a specific customer(s).

Customer Report: Report of all selected customers on one single sheet.

Employee Data Sheet: Contains all informational data for a single employee such as employee number, accounting system ID, name, address, phone(s), etc.

Employee Roster: Personal data of all selected employees. Uses same database as employee data sheet.

Employee Daily Summary Report: Shows day to day mobile and work activity of an employee. Calculates total time, job and mileage.

Employee Inventory Transactions Report: Presents a view of inventory items utilized by employees showing quantity and item of inventory that an employee used on a given date.

Employee Job Activity Report: Displays all Job-in/Job-out entries for selected employee and date range.

Employee Mileage Report: Details odometer entries for each selected employee, associated customer and date along with calculated mileage.

Employee Time Details Report: Sorting of time and job records by employee, separated by customer.

Employee Timesheet: Daily work time spent for one employee including an area for employee to add sign and signature approval.

Employee Time Summary Report: Provides view of employee's time/payroll information with date summaries.

Employee Complete Tracking Report: Shows day by day mobile activity of an employee.

Vehicle Complete Tracking Report: Shows day by day mobile activity of a mobile unit.

Employee Daily Travel Report: Shows daily in-transit activity for each employee, calculates daily averages and percentages and provides statistical analysis of data accumulated.

Vehicle Daily Travel Report: Shows daily in-transit activity for each mobile unit, calculates daily averages and percentages and provides statistical analysis of data accumulated.

Employee Stop Report: Provides detail of stop locations and duration for a given route on a specified employee by date and time.

Vehicle Stop Report: Provides details of stops for a given route on a specified mobile unit and can be sorted by employee.

Employee Power Activity Report: Provides detailed listing of where and when a mobile unit is powered on and off by employee.

Vehicle Power Activity Report: Provides detailed listing of where and when a particular mobile unit is powered ON/OFF.

Location Marking Status Report: Indicates whether there are marked locations that have not been assigned coordinates.

Inventory Roster Report: Provides a listing of all inventory items entered into the inventory form.

Inventory Status Roster by Inventory Number Report: Lists all transactions made which involved a selected inventory item(s). Organized first by inventory number, each line specifies the date and time of the transaction as well as involved employee and quantity of item used.

Inventory Status Roster by Item Number Report: Lists all transactions made which involved the selected inventory item.

Inventory Transaction Report by Inventory Number: Provides an itemization of an employee's utilization of inventory stock.

Inventory Transaction Report by Item Number: Provides an itemization of employee's utilization by item number.

Vehicle Activity Report: Provides an itemization of all time, job, and mileage activity as it relates to a specific service mobile unit.

Vehicle Assignment Report: Displays issuing data by mobile unit such as start and end dates and times as well as the employee to whom the vehicle was issued.

Vehicle Information Listing: Displays vehicle specific information of each mobile unit such as VIN number, license plate number, model, year, etc.

BRIEF DESCRIPTION OF THE DRAWINGS

FIG. 5 is an example of an Employee Daily Travel Report.

FIGS. 6A, 6B is an example of daily mileage report user screens with FIG. 6A showing total miles and FIG. 6B unmarking locations that are non-tax deductible.

FIG. 6C is an example of a resultant daily mileage report from action taken on user input screens shown in FIG. 6A, 6B.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
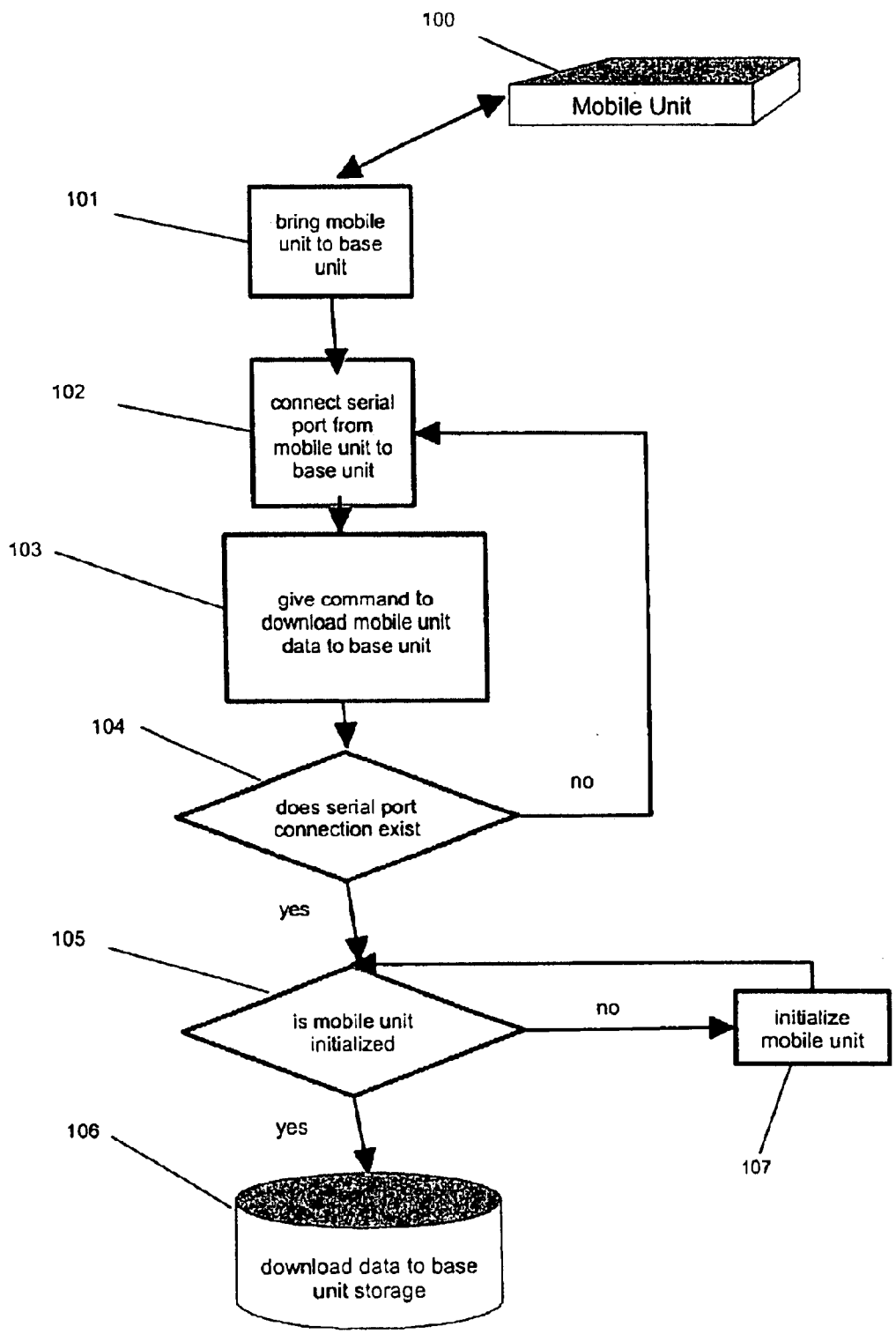
FIG. 1 is a logical flow chart of a mobile unit to base unit connection in downloading data.

Referring first to FIG. 1, a logical flow chart is shown of a process carried out between a mobile unit and a base station to which it is assigned and from which data has to be directly downloaded. That is, downloaded via PC serial cable connection.

Mobile Unit (block 100) is physically brought to the base unit (functional block 101). A direct serial port connection (functional block 102) is made from the mobile unit (block 100) to the base unit (block 101). The end user issues a command to download mobile unit data to the base unit (functional block 103). Software checks to see if a serial port connection exists (block 104). If a serial connection does not exist a message is given to the end user to connect the serial port from the mobile unit to the base unit (return to block 102). If the serial port connection does exist the software queries the mobile unit to see if it was initialized (block 105). If the mobile unit has not been initialized the end user receives a message to initialize the mobile unit (functional block 107) and the base unit will again query to see if the mobile unit is initialized (returns to block 105). If the mobile unit is initialized the data from the mobile unit is downloaded and stored (functional block 106) on the base unit.

Figure 1A:
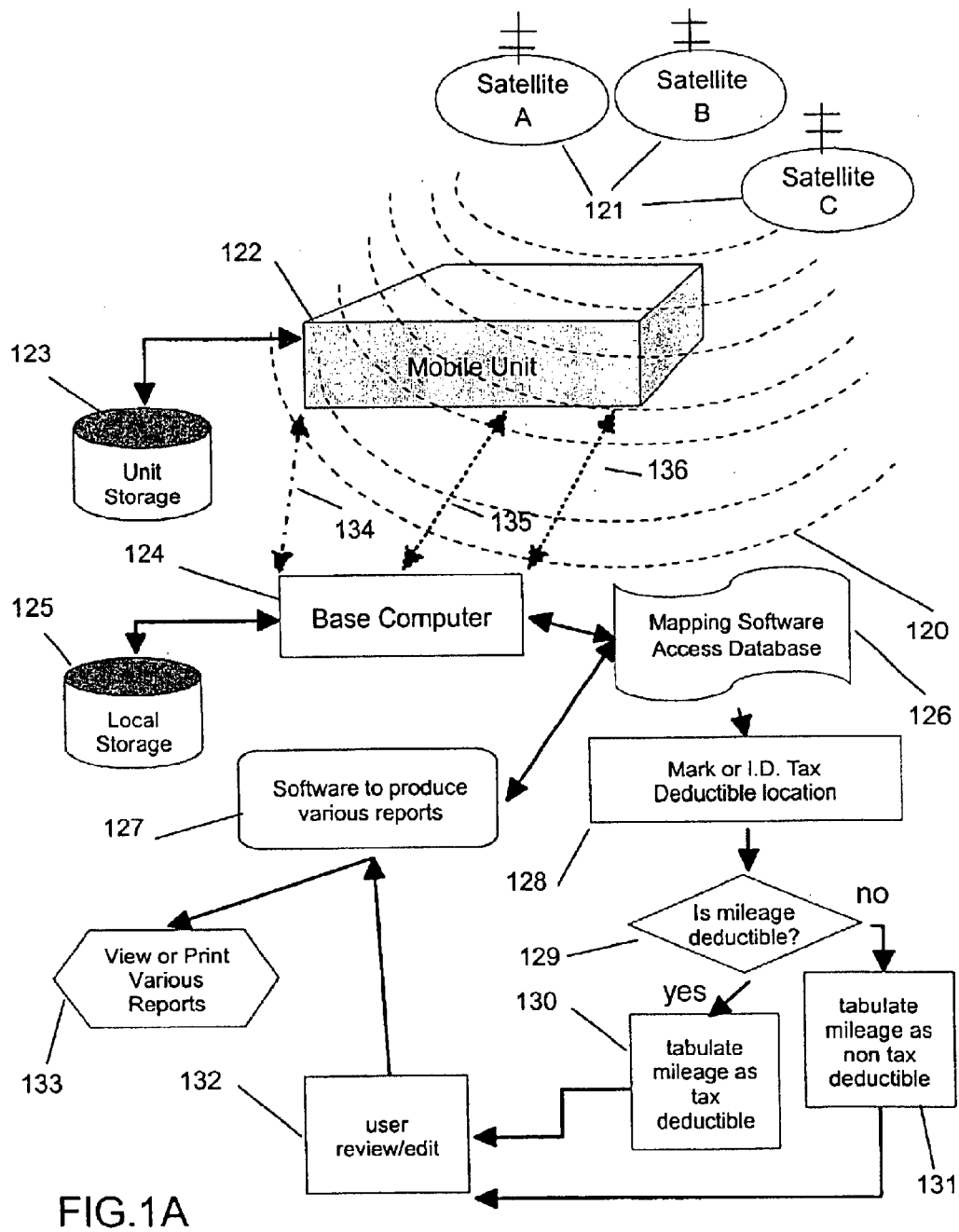
FIG. 1A is a logical flow chart of satellite to mobile unit to data flow including the tax-deductible tabulation for reporting.

FIG. 1A represents communications between satellites (121) and mobile unit (122). The satellites (121) send out GPS data signals (120). The GPS receiver in the mobile unit (122) receives information such as time, latitude, longitude, speed and heading every second and stores data over specific time intervals such as once every 10 seconds during movement of the mobile unit (121). Data is stored with the storage unit (123) of the mobile unit (122). Data is downloaded to a base computer (124) by a hard wire cable connection (136) or by wireless such as infrared (135) or a wireless radio transceiver (134). The base unit (124) will store the data within local storage (125). Mapping software (126) can access the database to generate various reports (127) or to help the user mark or identify a tax deductible location (128) based either on an actual stop made or a physical location on a map by street address. Once parameters are set, the software will check to see if the mileage is deductible (128). If mileage is not deductible, the software tabulates it as non-tax deductible (131). If the mileage is tax deductible, the software tabulates it as tax deductible (130). The user can review and edit mileage they would like to add or subtract for additional stops to be included or not included in the final report (132). The user cannot change the total mileage for the day as calculated by the GPS route but only the proportion of tax deductible versus non-tax deductible mileage. The user may then generate or view various reports (133) from the database.

Figure 1B:
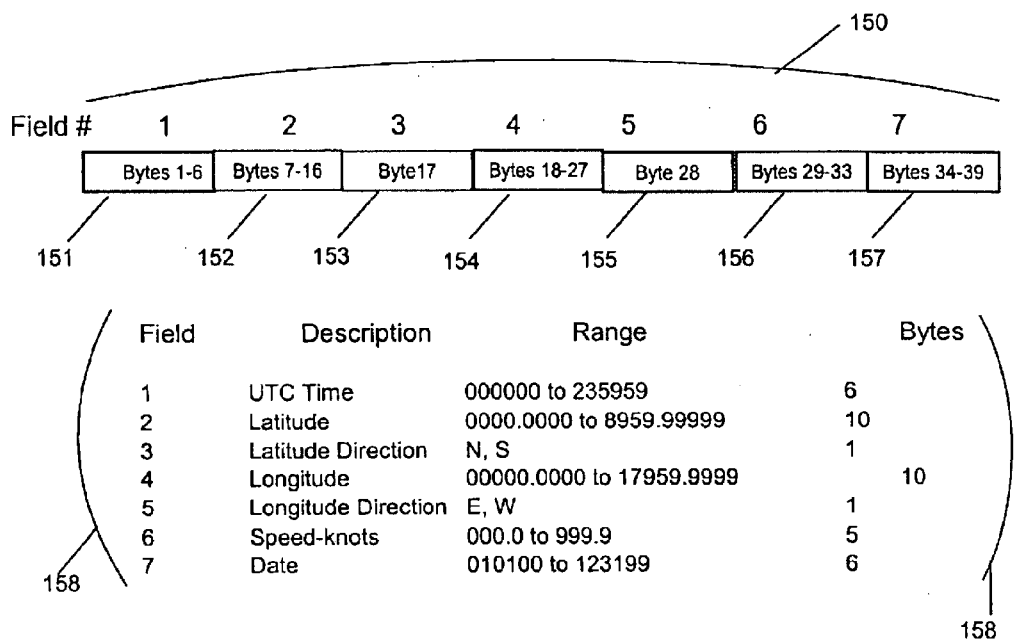
FIG. 1B represents a schematic of a data packet or GPS recorded data frame.

FIG. 1B represents a GPS recorded data frame (150) which is the packet data. The GPS recorded data frame (150) contains 7 fields consisting of 39 bytes of data. Bytes 1 through 6 (151) are found in field #1 and represent UTC (Universal Time Co-ordinated) and, as can be seen in the field description (158) the range goes from 000000 to 235959. Bytes 7 through 16 (152) are found in field #2 and represent latitude and have a range of 0000.0000 to 8959.9999 as seen in the field description (158). Byte 17 (153) represents latitude direction (North or South) as described in field #3 in the field description (158). Bytes 18 through 27 (154) found in field #4 represent longitude and range from 00000.0000 to 17959.9999 as seen in the field description (158). Byte 28 (155) in field #5 represents the longitude direction (East or West). Bytes 29 through 33 (156) represent the speed in knots as shown in field #6 and have a range of 000.0 to 999.9 as seen in the field description (158). Bytes 34 through 39 (157) represent the date with a range of 010100 through 123199 as seen in field #7 of the field description (158). GPS recorded data frames (or packet data) is collected by the mobile unit(s) over specific time intervals and stored at the mobile units flash memory with the most significant byte recorded first.

For example, a GPS longitude (154) of 16123.4567 would be recorded and stored in a flash memory address "N" to "N+9" (the 10 bytes of longitude field #4) as:

| Flash Memory Address | Data Byte |
| --- | --- |
| N | 1 |
| N + 1 | 6 |
| N + 2 | 1 |
| N + 3 | 2 |
| N + 4 | 3 |
| N + 5 | . |
| N + 6 | 4 |
| N + 7 | 5 |
| N + 8 | 6 |
| N + 9 | 7 |

As can be seen in the above example the most significant byte is stored at the first memory address "N".

Figure 1C:
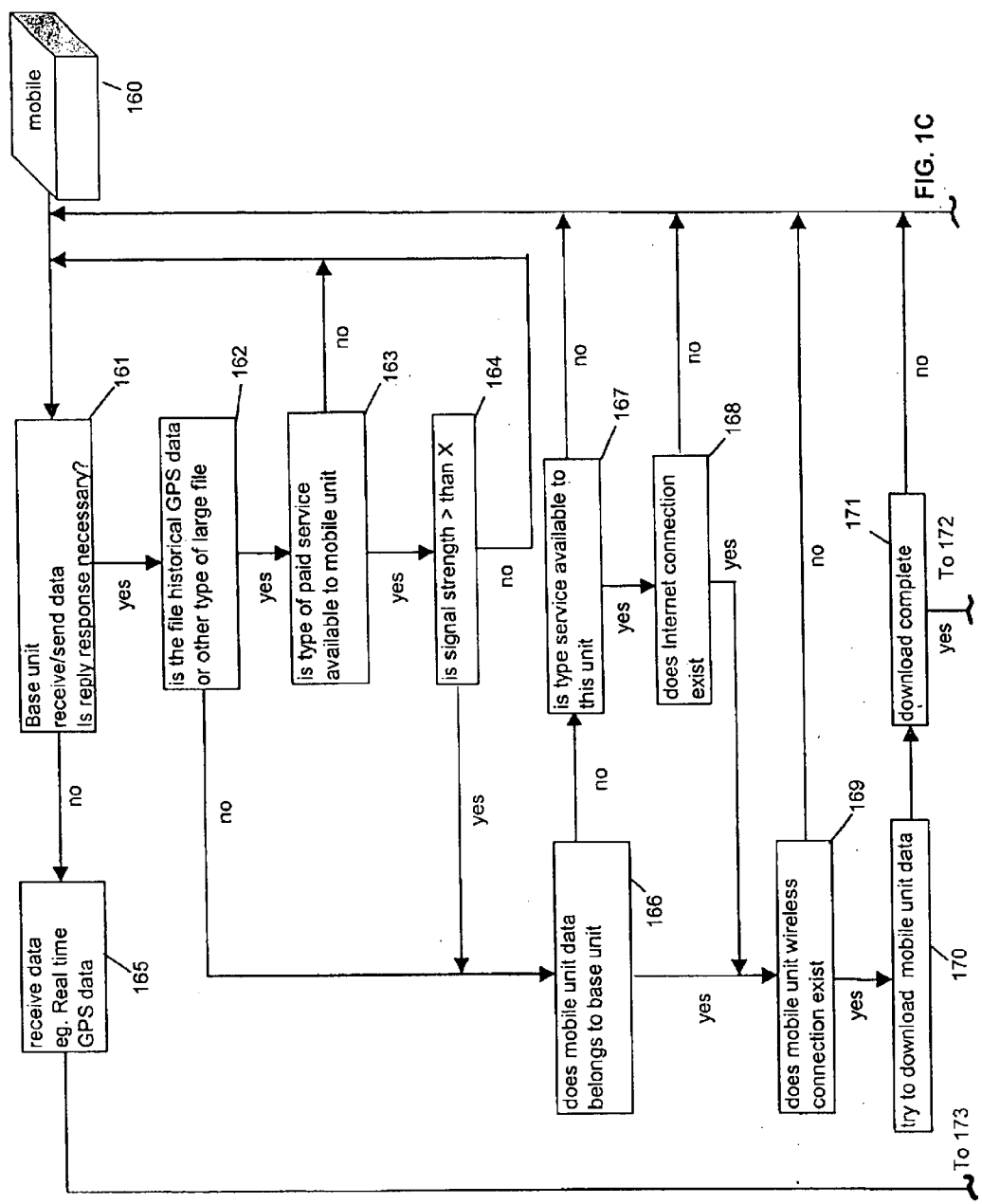
FIGS. 1C, 1D is a logical flow chart of a wireless mobile unit to base unit connection within a wide area network.
Figure 1D:
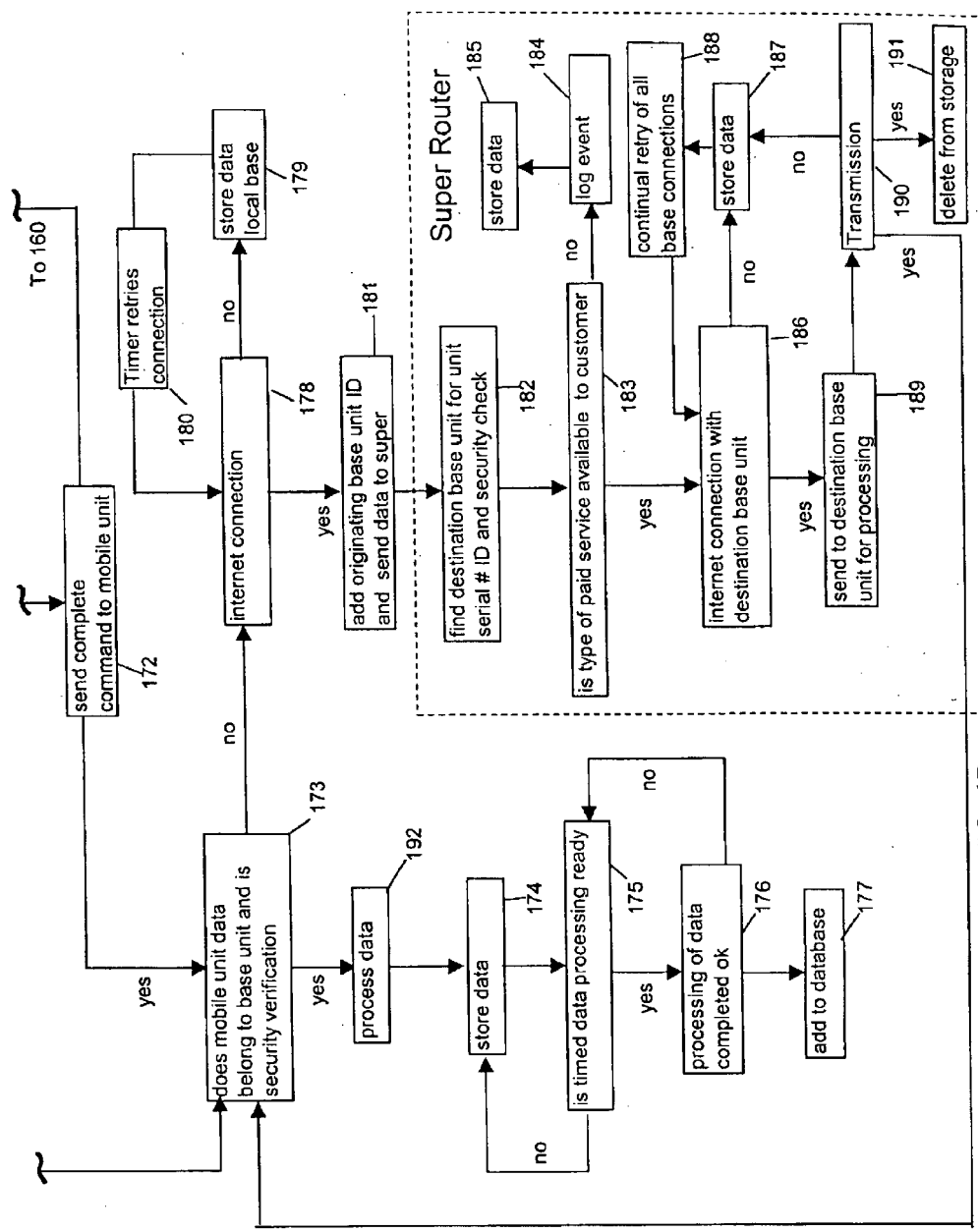

Referring first to FIG. 1C, 1D a logical flow chart is shown of a process carried out by a wireless link connection between a mobile unit and a base station within its area of operation.

Mobile Unit (block 160) establishes a wireless connection with a base unit (block 161) within receiving range. The base unit (block 161) determines if a reply is necessary. If no response is required the base unit receives data (block 165) for further processing. If no response is required, the base unit (block 161) will determine if the data is historical GPS data or another type of large file (block 162). If the data is historical or another type of large file the base unit will determine if the type of paid service is available to the mobile unit (block 163). The service type will be coded within the data packet. If the service is not a verified service the base unit will not receive the data. If the service is verified as available, the base unit will check to insure that the signal strength is at or above the acceptable limit (block 164). If the signal strength is not at or above the acceptable limit the data will not be received. If the signal strength is at or above the acceptable limit (block 164), the base unit will proceed to determine if the mobile unit belongs to the receiving base unit (block 166). If the mobile unit (block 160) does not belong to the base unit receiving data, the base unit will check to insure proper service is available (block 167) for that mobile unit (block 160). If the service is not a verified service the base unit will not receive the data. Next, the receiving base unit will determine if an Internet connection exists (block 168). If no Internet connection exists, download processing does not proceed. If an Internet connection does exist (block 168), the base unit will insure that a wireless connection still exists (block 169). If the connection exists, the base unit will attempt to download the mobile unit data (block 170). Once the download is complete (block 171), the base unit will send a complete command (block 172) to the mobile unit (block 160).

Once packet data or large file data is received (block 165 or 172), the base unit will determine if the data belongs to itself and perform a security verification (block 173). Note that the data for determination (block 173) may have come directly into the base unit from a mobile unit or it may have come from the Super Router. If the data belongs to the receiving base then the data is processed (block 192). Data is then locally stored (block 174). Current data is held for processing until a timer or command is issued (block 175) to process the data. Once current data is processed (block 176) satisfactorily, the data is added to the database (block 177).

If the data did not belong to the receiving base unit (going back to block 173), the receiving base unit would determine if an Internet connection is available (block 178). If no Internet connection is available the base unit would store the data locally (block 179) and retry an Internet connection (block 180) based on preset timing. If an Internet connection is established (block 178), the originating base unit will add its unit ID and sends data to the Super Router (block 181).

The Super Router maintains a registry of all base units and associated mobile units. It checks to find the destination base unit associated with the data packet from the mobile unit (functional block 182). Next, the super router checks to see if the destination base unit has the proper service available (test block 183). If no service is available, the super router logs the event (block 184), then stores the data locally (block 185) until it can be retrieved by the end user or proper service is made available to the base unit. If the destination base unit has available service (block 183), the Super Router checks for an Internet connection (block 186). If an Internet connection does not exist (block 186), the Super Router logs the event and stores the data locally (block 187). The Super Router will continue to retry all base connections for data that was not sent (block 185). If an Internet connection exists (block 186), the super router sends the data to the destination base unit for processing (block 189). If transmission of data is completed satisfactorily (block 190), data is deleted from local Super Router storage (block 191). If the transmission of data is not completed satisfactorily, data is locally stored (block 187) for continual retry to the base connection (block 188). The destination base unit then goes through the processing routine previously described above (starting at block 173 and continuing down through block 177).

Figure 2:
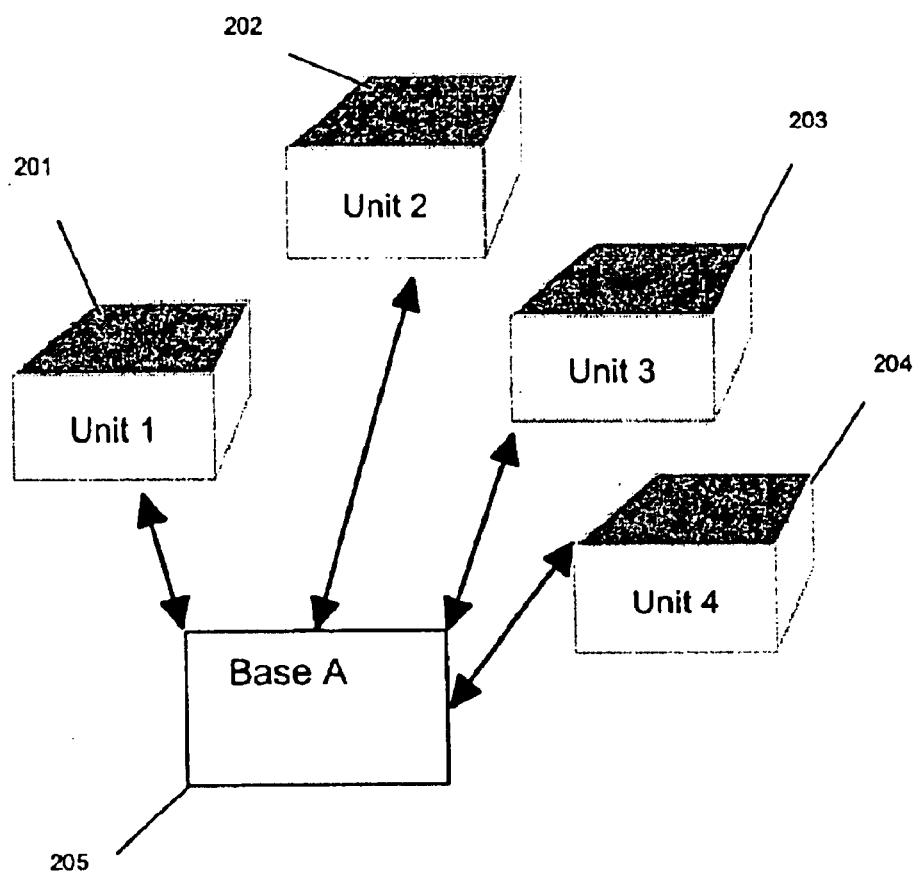
FIG. 2 is a schematic of wireless links between four mobile units and a base unit.

FIG. 2 represents base unit A (block 205) that is set up for four local mobile units (blocks 201, 202, 203, 204). That is, mobile units (blocks 201, 202, 203, 204) belong to base unit A (block 205). If all mobile units remain within a wireless range to base units A (block 205), then packet data is received by the base unit A (block 205) and stored. Otherwise mobile units must be brought directly to the base unit and data downloaded as described in FIG. 1.

Figure 2A:
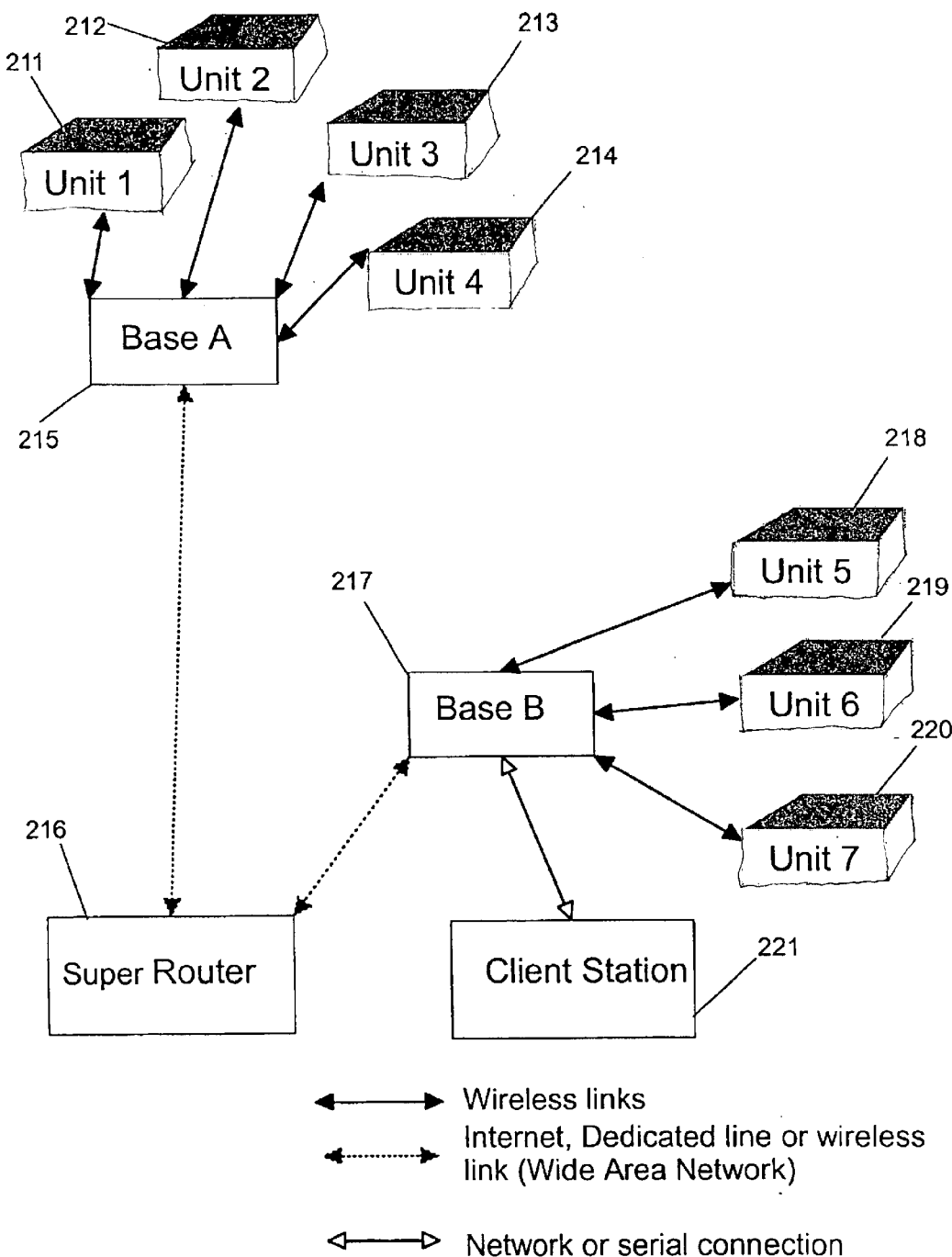
FIG. 2A is a schematic of wireless links between a pair of base units and a super router with all mobile units within range of their respective base unit.

FIG. 2A represents base unit A (block 215) which is set up for four local mobile units (blocks 211, 212, 213, 214). That is, mobile units (blocks 211, 212, 213, 214) belong to base unit A. FIG. 2A also shows base unit B (block 217) which is set up for three local mobile units (blocks 218, 219, 220) which belong to base unit B (block 217). FIG. 2A also shows super router (block 216) which retains a registry of all base units and the relationship to mobile units. FIG. 2A also shows a client station (block 221) for database and administrative management of the super router. Base units A (block 215) and B (Block 217) will update the super router (block 216) with each new mobile unit added respectively. If all mobile units remain within a wireless link local to their respective base units A or B, then packet data is received by the respective base units and stored. Client station (block 221) accesses the shared network resources provided by base units A and B and contains the end-user programs for reporting, viewing tracks, updating the database with company information and other end-user tasks.

Figure 2B:
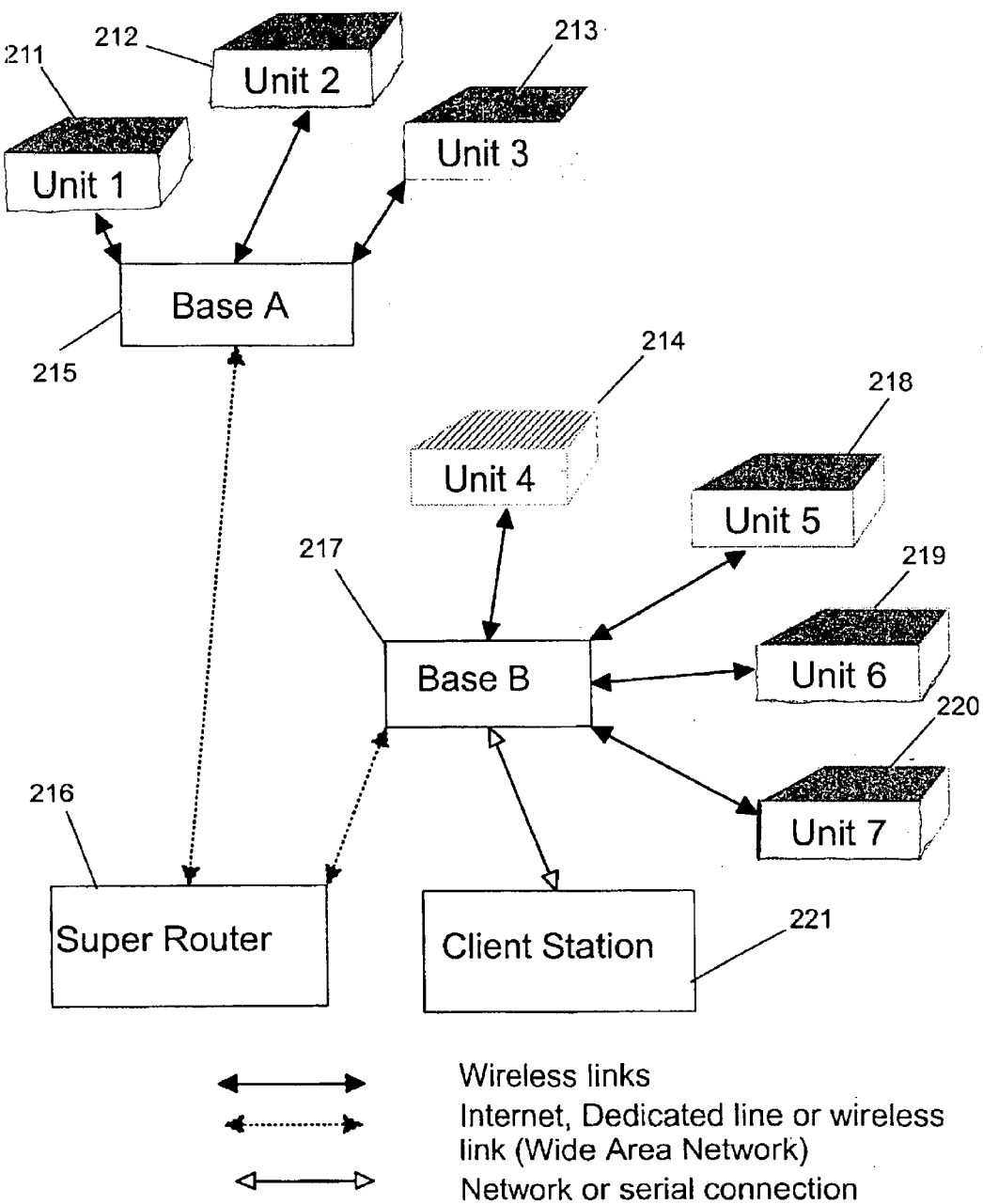
FIG. 2B is a schematic of wireless links between a pair of base units and a super router with one mobile unit outside of its home base unit and communication with another base unit, the preferred embodiment.

FIG. 2B represents mobile unit 4 (block 214) moving out of, the wireless range of base unit A (block 215) and into the wireless range of base unit B (block 217). When this occurs base unit B (Block 217) goes through the procedures as described in FIGS. 1C, 1D to route packet data downloaded from mobile unit 4 (block 214). Receiving base unit B (block 217) will check for Internet connection to send the packet data to the super router (block 216) that will contain a registry of all base units and respective mobile units. Once base unit B (block 217) sends packet data from mobile unit 4 (block 214) to super router (block 216), super router (block 216) will determine that mobile unit 4 (block 214) belongs to base unit A (block 215) and route the data to base unit A (block 215) for processing and storage. Also shown in FIG. 2A is a Client Station computer (block 221) that allows the end user to access data logged and stored by each base unit and also to perform other administrative functions. The client Station (block 221) is connected to the base unit via a network or serial connection. The Client Station (block 221) can also access data stored temporarily at the super router (block 216). For example, if the super router (block 216) cannot establish an Internet access to base unit A (block 215), then the super router (block 216) will temporarily store the mobile unit 4 (block 214) data.

Figure 3A:
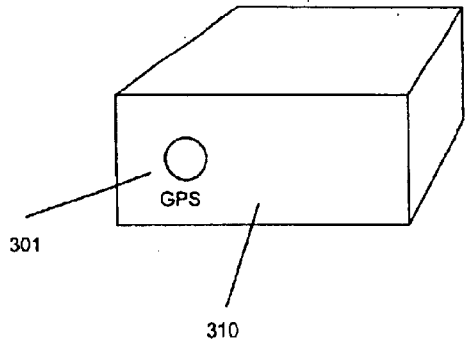
FIG. 3A is a front perspective view of a basic mobile unit.
Figure 3B:
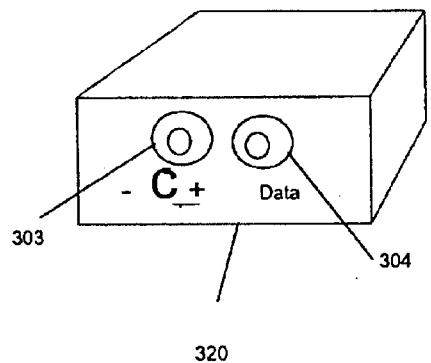
FIG. 3B is a side perspective view of the unit shown in FIG. 3A.
Figure 3C:
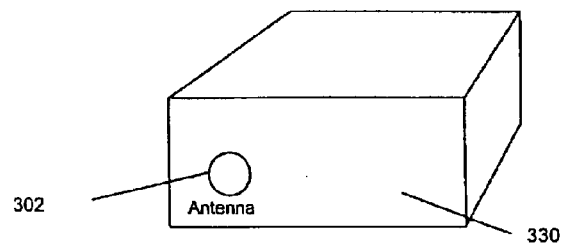
FIG. 3C is a rear perspective view of the unit shown in FIG. 3A.

FIGS. 3A–3C show examples of mobile unit configurations.

FIG. 3A represents a frontal perspective view of a mobile unit (block 310). An LED (Light Emitting Diode block 301) will be RED if the unit is powered but not receiving GPS signals. The LED 301 will be GREEN when there are adequate GPS signals from the satellites. The LED 301 will blink RED or GREEN when the mobile unit's data buffer is full.

FIG. 3B represents a side perspective view (block 320) of a basic mobile unit (block 310). It contains a power connection 303 and a data connection 304 to a computer for direct downloading of packet data.

FIG. 3C represents a rear perspective view (block 330) of a mobile unit (block 310). The rear of the mobile unit (block 330) has a GPS antenna connection 302.

Figure 4:
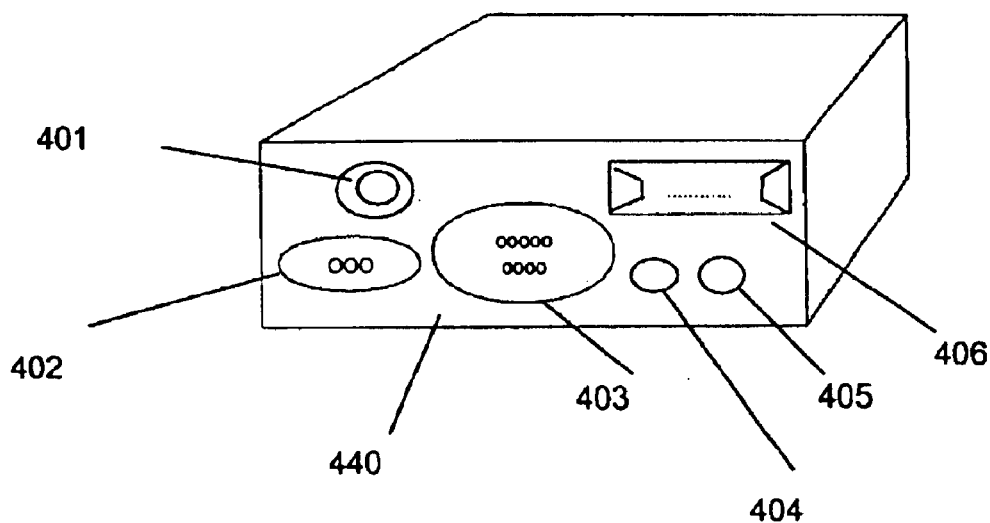
FIG. 4 is a rear perspective view of a high-end or more sophisticated mobile unit shown in FIG. 3A.

FIG. 4 (block 440) represents a more sophisticated version of a mobile unit. The mobile unit shown contains a GPS antenna connection 401, a power terminal 402, a Serial PC connection port 403, a radio connection 404, a Differential GPS adapter port 405, and a parallel data collection port 406.

Several of the many types of reports are shown in FIGS. 5, 6C.

FIG. 5 shows an employee Daily Travel Report. The purpose of this report is to show daily in-transit activity for each employee, calculate daily averages and percentages, show tax deductible mileage, non-tax deductible mileage as well as provide a statistical analysis of data accumulated. The example report shown shows employee name (block 501), date (block 502), total Tax Deductible Mileage (block 514) and total Non-Tax Deductible Mileage (block 515). Also shown are many details of the activities of the day. Start times (column block 504), stop times (column block 505) time duration (column block 506), action type (column block 507), vehicle identification (block 516), location name (s) (column block 508), tax deductible locations (column block 511), in transit mileage (column block 509) and tax deductible mileage (column block 510) are among the various details. A total of each individual tax-deductible mileage (column block 510) is added up and the total is shown in tax-deductible mileage as 62.26 miles (block 514). The non-tax deductible mileage total is shown as 2.48 miles (block 515). This report has an area for the employee to input a note as shown in the Memo area (block 512). Block 513 shows comparison and statistical data for administrative use. Such data shows the number of stops, number of routes, total mileage along with time at stops, time in transit, average mileage per route. Statistical data also shows percentage of time spent at stops versus percentage of time spent in transit.

A summary of the report is as follows:

| Leg | Start | Stop | Mileage | User Action | Tax Deductible Mileage |
|---|---|---|---|---|---|
| 1 | Begin | L-Whataburger at 59 | 0.23 | Invalid | 0 |
| 2 | L-Whataburger at 59 | L-Home Office | 13.50 | Valid | 13.50 |
| 3 | L-Home Office | US HWY 90A | 2.81 | Valid | 2.81 |
| 4 | US HWG 90A | Dairy Ashford Rd/State Spur 41 | 2.25 | Invalid | 0 |
| 5 | Dairy Ashford Rd/State Spur 41 | L-Restaurant | 17.42 | Valid | 17.42 |
| 6 | L-Restaurant | L-Houston Astrodome | 0.57 | Valid | 0.57 |
| 7 | L-Houston Astrodome | End 22-49 Harbor View Dr. | 26.96 | Valid | 26.96 |

Total Mileage: 64.74
Total Tax Deductible Mileage: 62.26
Total Non-tax Deductible Mileage: 2.48.

As can be seen from the above example, there were two valid legs (1 and 4) and five valid legs (2,3,5,6,7). Legs 1 and 4 can be marked by the end user as invalid by a graphical user interface (GUI) screen which is explained in FIG. 6A below.

FIG. 6C is a vehicle daily travel report that is similar to FIG. 5, the employee daily travel report. In the following example mileage had been marked by the end user as tax deductible as shown in FIG. 6A. The end user actions lead to the report of FIG. 6C.

As can be seen in the graphical user interface screen of FIG. 6A, the total marked mileage (520) is 6.71 miles. The end user can review the 7 marked stops (521, 522, 523, 524, 525, 526, 527) along the left edge of the screen. In the example given the end user determines that all marked stops are tax deductible. This can be seen by the check marks left intact by the end user (stops 521 through 527) along the left edge of FIG. 6A. The total tax-deductible mileage is shown on the GUI screen as 6.71 miles (520).

Figure 6B:
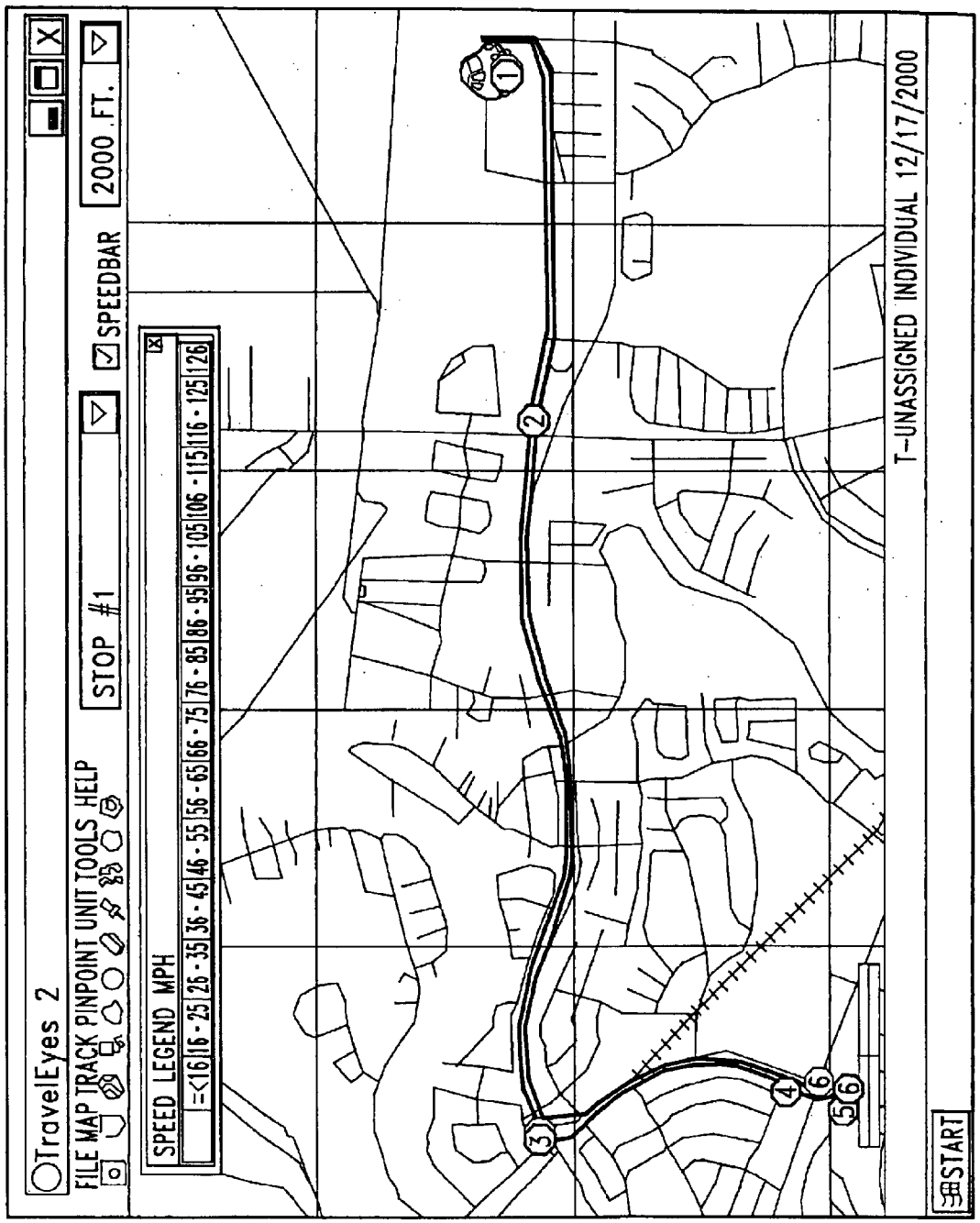

FIG. 6B details the route showing all stops. Stops are labeled 1 through 6 respectively with stop 7 being the return to base.

The resultant generated vehicle daily travel report is shown in FIG. 6C. The vehicle identification is shown on top of the report (601). Driver identification is shown on the top left of the report (602). The total tax deductible mileage is shown on the report as 6.71 miles (603) and the total non-tax deductible mileage is shown as 0.0 miles (604). In this example the end user determined all stops to be valid. The remainder of the report is similar to that described in FIG. 5 above which was described in detail.

The overall purpose of vehicle daily travel report (FIG. 6C) is to show daily in-transit activity for each vehicle, calculate daily averages and percentages as well as provide a statistical analysis of the data overall. Vehicle ID is represented (block 601) along with date (block 605) and drivers name(s) (block 602). Daily totals (block 606) show comparison and statistical data for administrative use. Such data shows the number of stops, number of routes, total mileage along with time at stops, time in transit, total mileage, average mileage per route. Also shown is average time per stop, average time per route, and total accrued time. Statistical data also shows percentage of time spent at stops versus percentage of time spent in transit.

FIGS. 7A through FIG. 7F represents a partial daily route showing point to point directions.

Figure 7A:
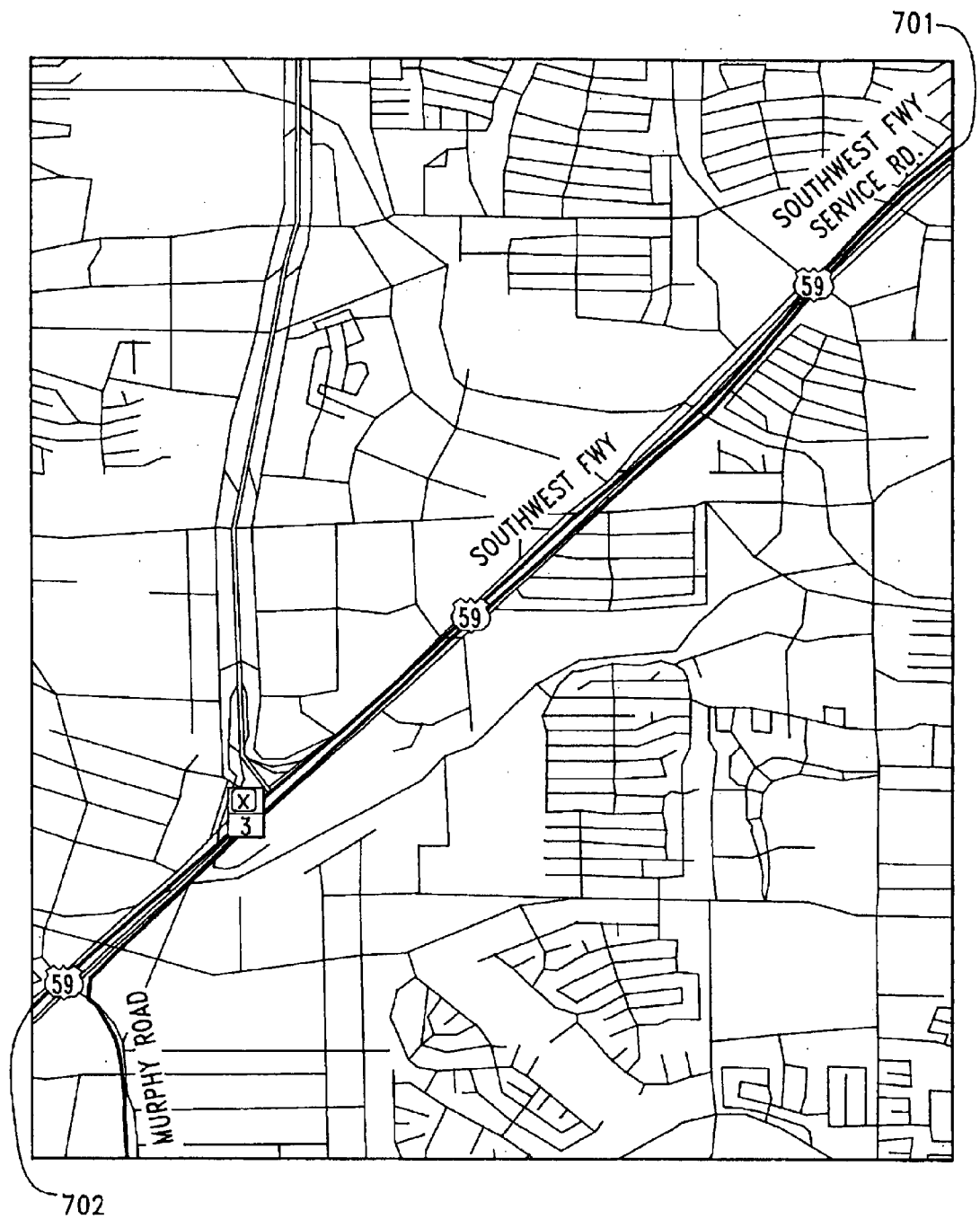
FIGS. 7A, 7B, 7C, 7D, 7E, 7F, is an example of mapping point to point directions for a route.
Figure 7B:
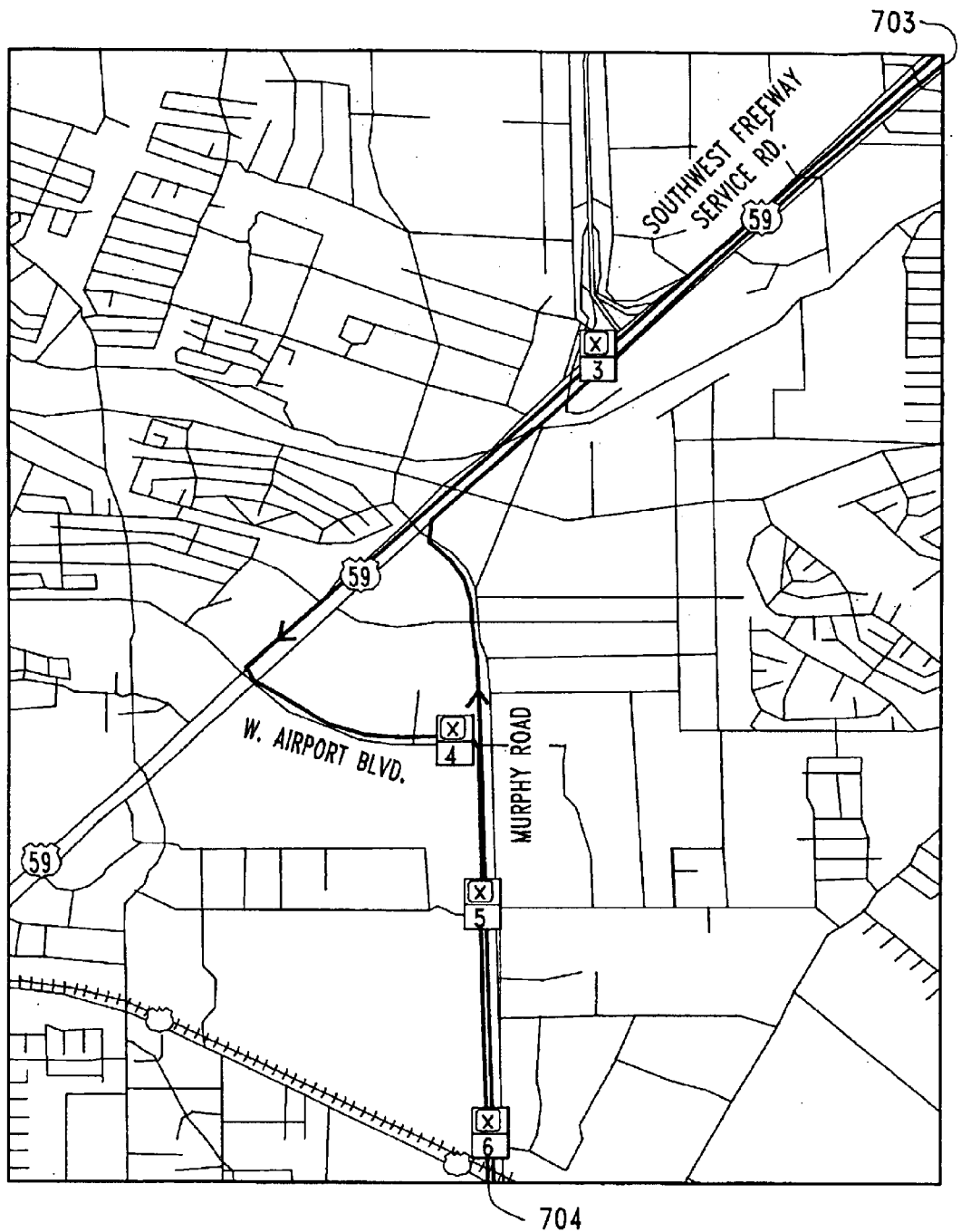
Figure 7C:
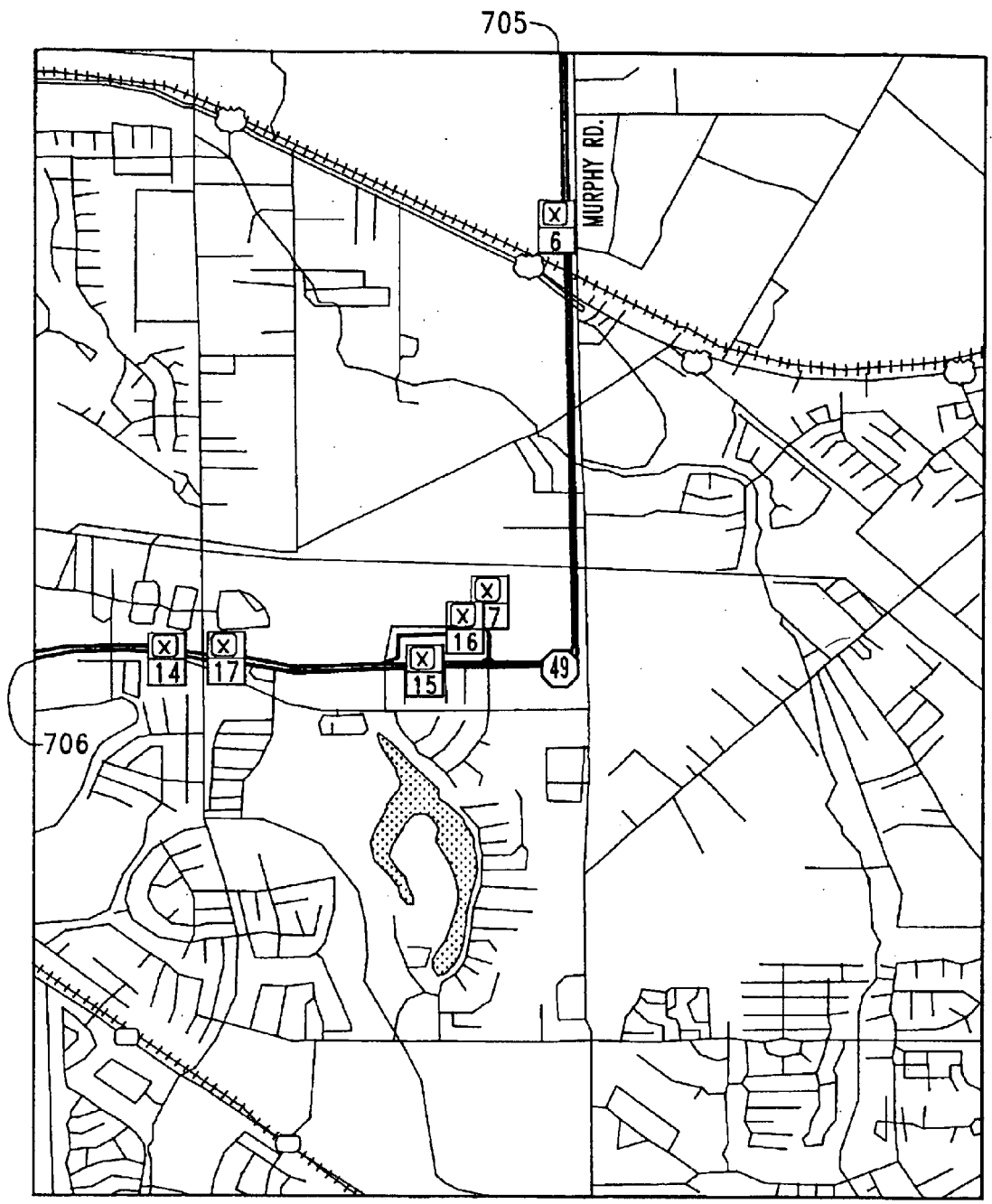
Figure 7D:
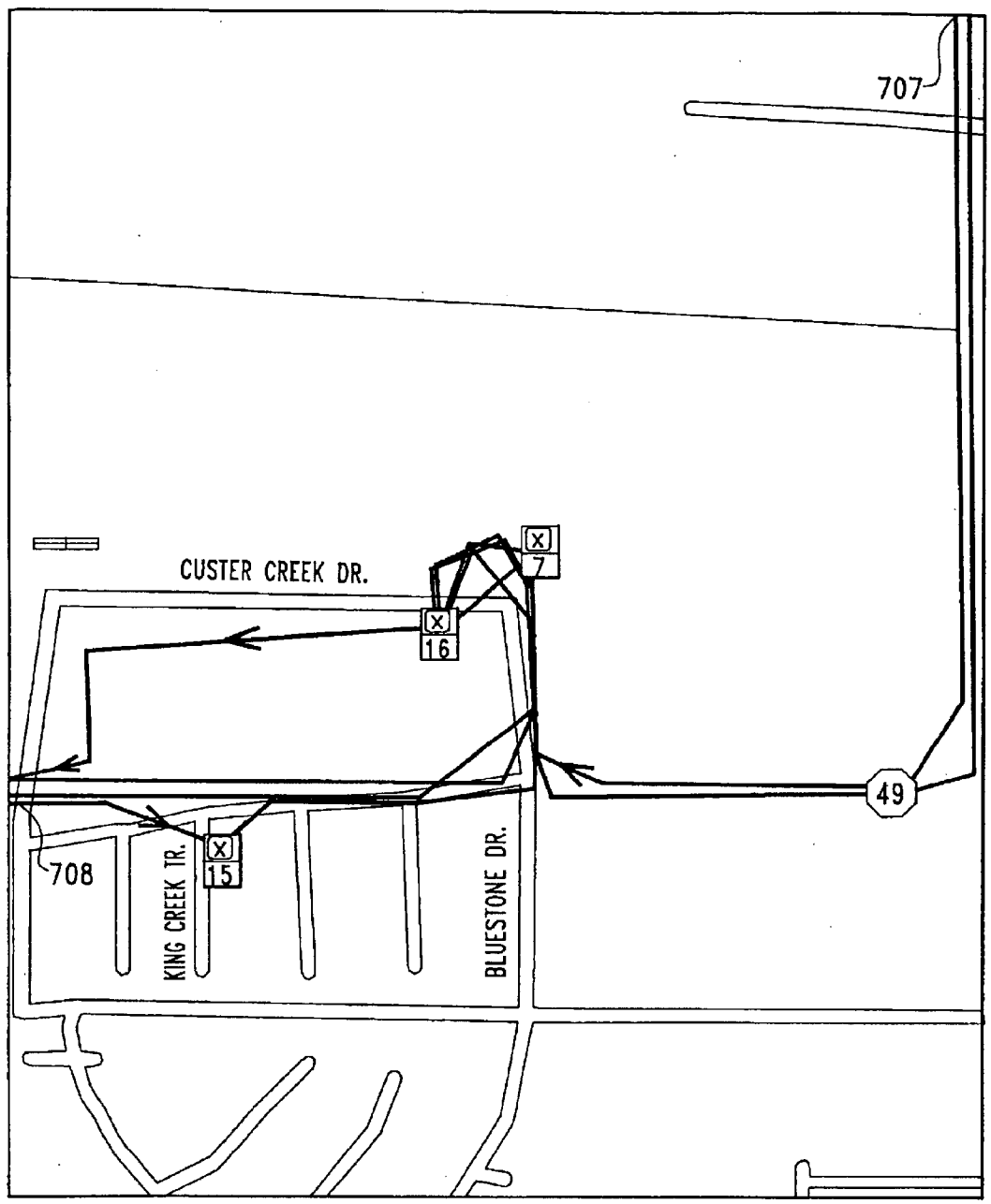
Figure 7E:
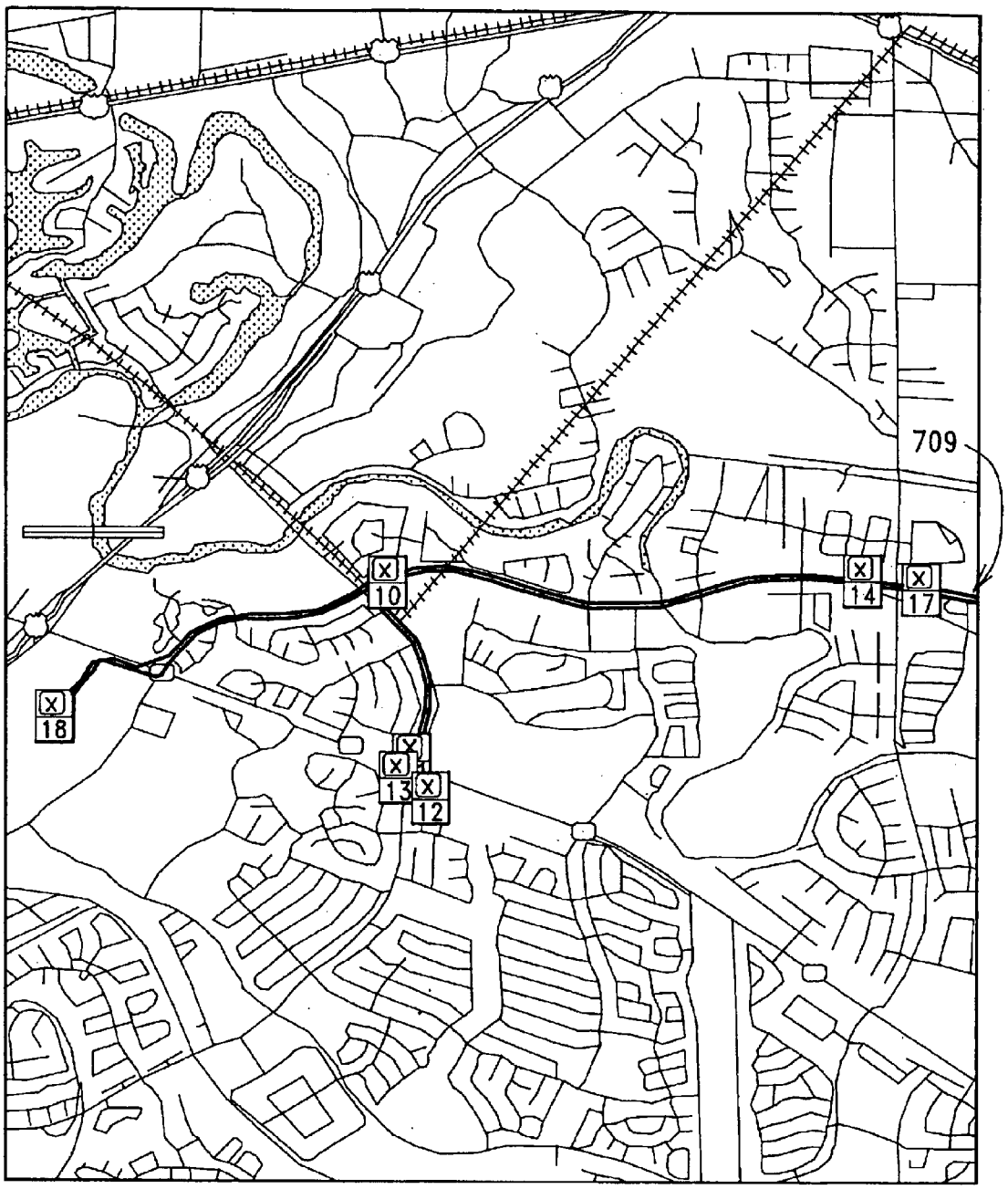
Figure 7F:
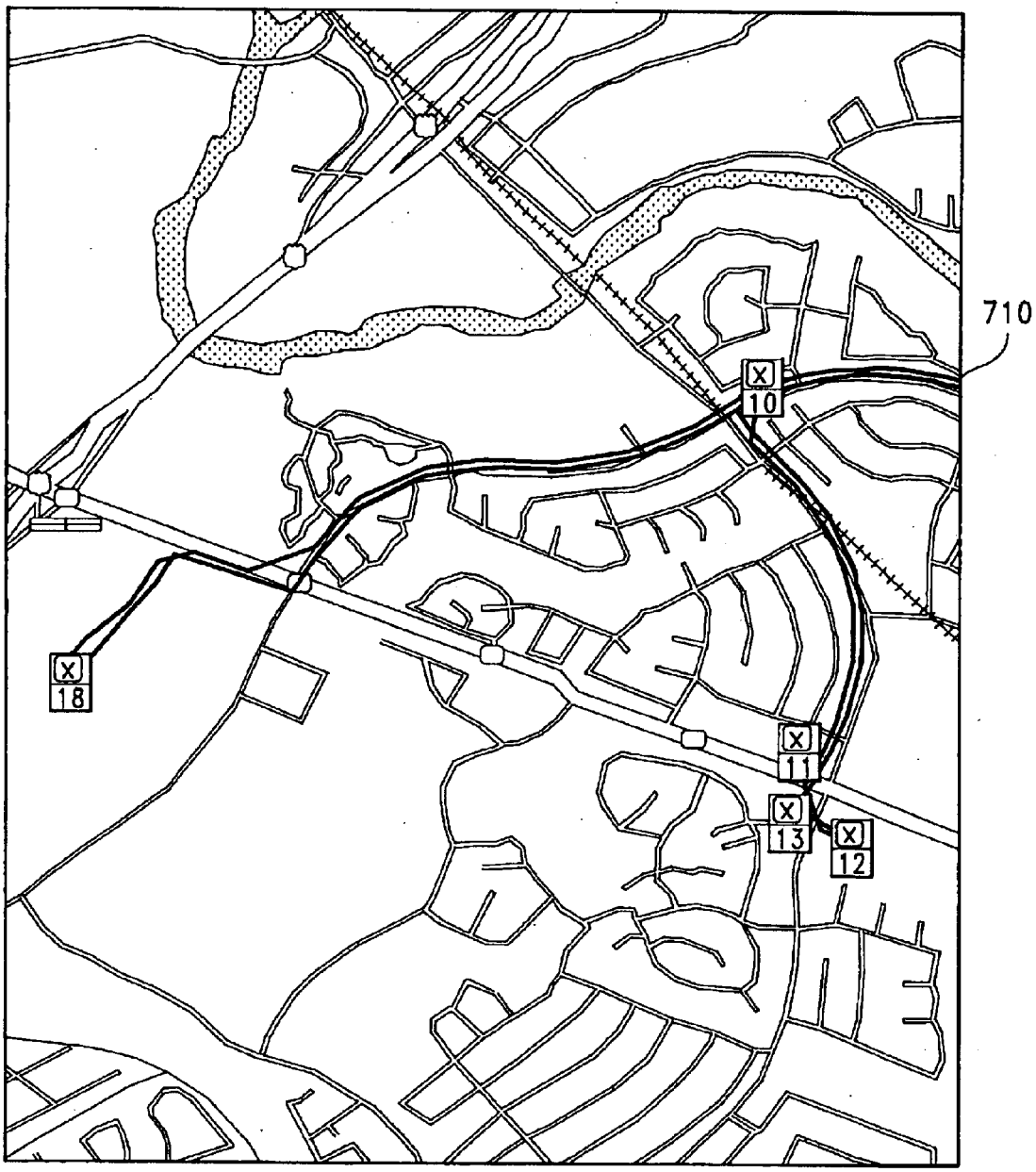
Figure 8:
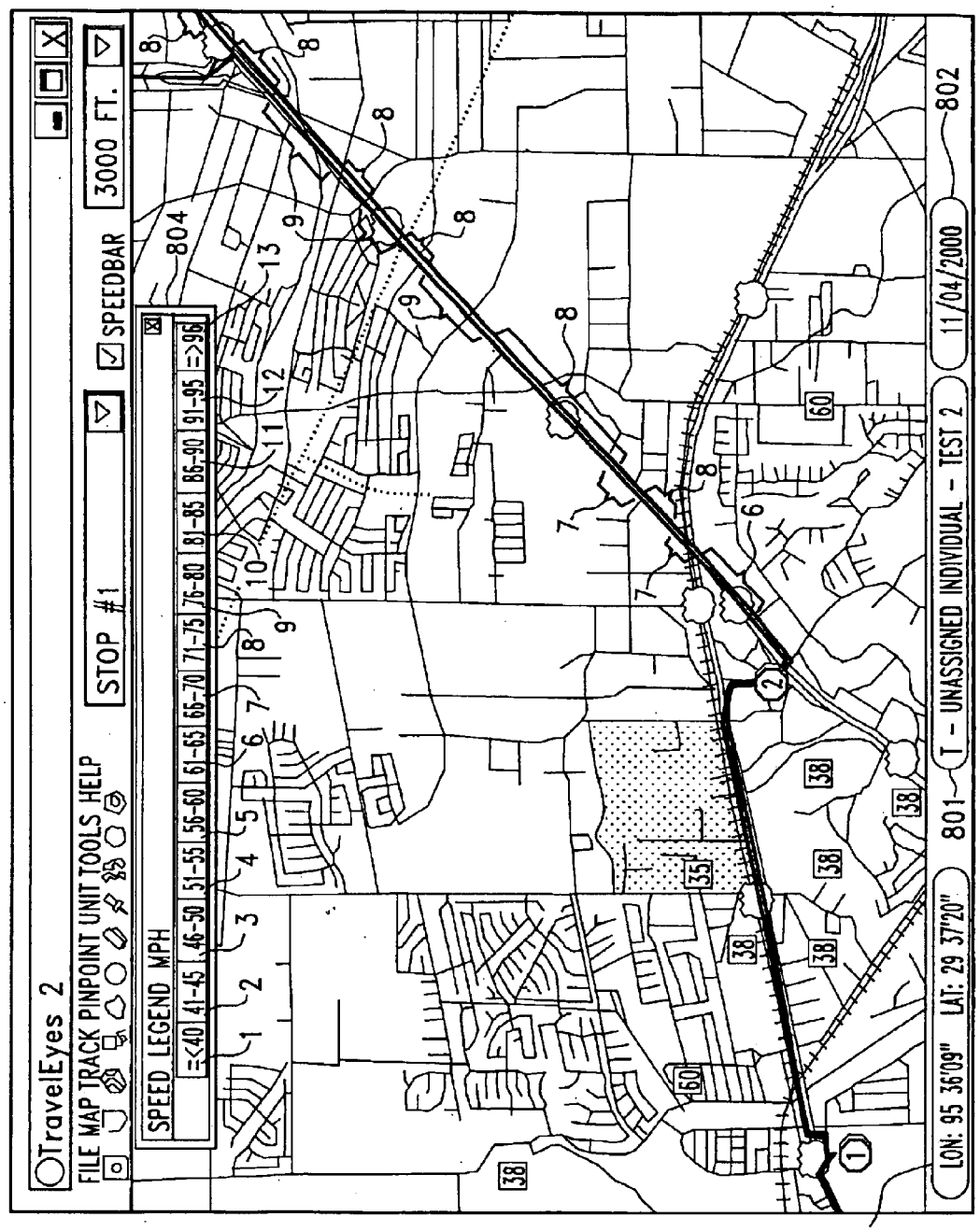
FIG. 8 represents a tracking report of a vehicle route also showing speed indicia.

Beginning with FIG. 7A the route proceeds southwesterly from point 701 to point 702 along the SOUTHWEST FWY making a stop at location 3 prior to proceeding again onto SOUTHWEST FWY. FIG. 7B picks up the route from point 703 to 704 again proceeding southwesterly along SOUTHWEST FWY to W. AIRPORT BLVD to make stop 4, then onto MURPHY RD. to make stops 5 and 6 and continuing South on MURPHY RD. to point 704. FIG. 7B also shows return route going North on MURPHY RD. to pickup Rt. 59 (SOUTHWEST FWY) in a northeasterly direction. FIG. 7C starts at point 705 and proceeds South along MURPHY RD. (stop 6 is shown again as in FIG. 7B) to West along Rt. 49 showing stops 7, 16, 15, 17, and 14 prior to proceeding again West on Rt. 49 to point 706. FIG. 7D shows more detail of stops 7, 16 and 15 from point 707 to point 708. FIG. 7D shows turning right onto BLUESTONE DR. to stop 7, stopping for gas at 16, proceeding westerly on CUSTER CREEK DR. to point 708. It also shows the return route going East on Rt. 49 and turning right on KING CREEK RD. to make stop 15 during the return. FIG. 7E picks up the travel route again showing stops 14 and 17 as in FIG. 7C. It proceeds West to show stops 10, 18, 11, 13 and 12. FIG. 7F shows a blow-up detail of stops 10, 18, 11, 13 and 12.FIG. 8 shows a vehicle tracking report. Driver name (block 801), date (block 802), longitude/latitude (block 803) and route are shown. Speed indices (rates of speed) are indicated shown graphically with color printouts. Speeds are depicted by various colors. For example, Yellow shows a rate of speed range of 76–80 mph while green shows a speed range of 81–85 mph and blue shows a rate of speed of 86–90 mph. In the example shown in FIG. 8 it can be seen that the driver was travelling 81–85 mph (804 representing GREEN) then sped up to 86–90 mph (805 representing BLUE), back down to 81–85 mph (806 representing GREEN) and down to 76–80 mph (807 representing YELLOW). If the speed limit on DIXIE FARM RD. were 55 mph or 65 mph perhaps the administrator or manager would take appropriate action against driver Janet.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A method for monitoring a fleet of mobile vehicles, wherein each mobile vehicle has an electronic system used to track a location of the mobile vehicle, the method comprising the steps of:

a. providing an on-board mobile vehicle location sensor and data communication module, wherein the module has an on-board unique identifier;
   b. providing a first base unit having a unique identifier and having a data communication module to receive data from the mobile vehicle data communication module and send data to a super router, and the first base unit having a registry of mobile vehicles assigned to itself;
   c. providing a second base unit having a unique identifier and having a data communication module to receive data from a mobile vehicle assigned to it and send data to the super router;
   d. providing the super router with a program to store and compare a plurality of base unit identifiers and a relationship of mobile vehicle identifiers assigned to each base unit; and
   e. providing an algorithm in the super router to permit a mobile vehicle to execute a roam from the first to the second base unit, the algorithm providing a storage of data relative to the roam in the super router.

2. The method of claim 1, wherein the electronic system used to track a location further comprises a GPS or other means to determine position and location.

3. The method of claim 2, wherein the on-board mobile vehicle location sensor and data communication module further comprises an on-board processor, a data storage module, a GPS receiver, and a wireless communication sub-system.

4. The method of claim 3, wherein the first base unit further comprises a wireless sub-system and an Internet connection.

5. The method of claim 4 further comprising the step of collecting and processing data related to tax deductible stops, routes, and speeds of each mobile vehicle.

6. A method for collecting GPS data for a plurality of fleets of vehicles, each vehicle having an on-board processor, the method comprising the steps of:

a. installing in a vehicle an electronic system having a GPS and a communication subsystem;
   b. said GPS and communication subsystem further comprising an on-board unique identifier;
   c. collecting GPS coordinate data via the electronic system and transferring said GPS coordinate data to a first base computer;
   d. assigning the first base computer to a first client, and creating a registry of subsystems assigned to the first base computer;
   e. repeating steps a–d for a second client and assigning a second base computer to the second client;
   f. creating a super-router having a communications module to send and receive data among the first and the second base computer;
   g. creating a registry in the super router of all subsystems identifier's and a predetermined relationship to each base computer;
   h. moving a roaming vehicle having a subsystem from the first geographic region to the second geographic region;
   i. transmitting data from the roaming vehicle's subsystem to the second base computer;
   j. recognizing in the second base computer that the data received from the roaming vehicle subsystem belongs elsewhere;
   k. using the super-router, transferring the data to an appropriate base computer.

7. A method of claim 6 further comprising the steps of:
a. monitoring and storing a route including stops of the vehicle;
b. comparing said stops to a table of pre-authorized stops; and
c. reporting a distance traveled between a first and a second pre-authorized stop.

8. The method of claim 7, wherein at least one pre-authorized stop is a tax deductible stop.

9. The method of claim 7, wherein the step of comparing said stops further comprises inputting user data which selects valid versus invalid stops between a first and a second pre-authorized stop.

10. The method of claim 7, further comprising the step of inputting user data and selecting valid and invalid legs of the route.

11. The method of claim 10, further comprising the step of inputting user data and selecting valid and invalid legs of the route for tax purposes.

12. The method of claim 11 further comprising a step of computing a tax deductible total distance for the route.

13. The method of claim 12 further comprising the step of inputting and calculating inventory data related to the route.

14. The method of claim 13 further comprising the step of comparing inventory data between a first and a second vehicle.

15. The method of claim 12 further comprising the step of reporting data showing a time of stops versus a time of transit.

16. The method of claim 12 further comprising the step of reporting stops designated as customers.

17. The method of claim 12 further comprising the step of collecting an employee identity.

18. The method of claim 12 further comprising the step of collecting a vehicle identity.

19. The method of claim 12 further comprising the step of collecting data from a plurality of vehicles.

20. The method of claim 12 further comprising the step of presenting a graphical depiction of the route superimposed on a map.

21. The method of claim 20 further comprising the step of using colors for coding and displaying a colored route history where changing colors represents changing speeds.

22. A method of claim 12 further comprising the step of using a time originating from the vehicle location subsystem to record employee time worked data.

23. A system for collecting GPS data for a plurality of fleets of vehicles, each vehicle having an on-board processor, the system comprising:
a. means for installing in a vehicle an electronic system having a GPS and a communication subsystem;
b. said GPS and communication subsystem further comprising an on-board unique identifier functioning to identify itself when communicating data to a receiving computer;
c. means for collecting GPS coordinate data via the electronic system and means for transferring said GPS coordinate data to a first base computer;
d. means for assigning the first base computer to a first geographic region, and means for creating a registry of subsystems assigned to the first base computer;
e. means for creating a second geographic region and assigning a second base computer to the second geographic region;
f. means for creating a super-router having a communications module to send and receive data among the first and the second and x number of base computers;
g. means for creating a registry in the super router of all subsystems identifier's and a predetermined relationship to each base computer;
h. means for the second base computer to receive data from a roaming vehicle assigned to the first base computer, and means for the second base computer to pass said data to the first base computer;
i. means for transmitting data from the roaming vehicle's subsystem to the second base computer;
j. means for recognizing in the second base computer that the data received from the roaming vehicle subsystem belongs elsewhere; and
k. means for using the super-router to transfer the data to an appropriate base computer.

24. The system of claim 23 further comprising:
a. means for monitoring and storing a route including stops of the vehicle;
b. means for comparing said stops to a table of pre-authorized stops; and
c. means for reporting a distance traveled between a first and a second pre-authorized stop.

25. The system of claim 24, wherein the table of pre-authorized stops includes at least one tax deductible stop.

26. The system of claim 24, further comprising means for comparing said stops and means for inputting user data which selects valid versus invalid stops between a first and a second pre-authorized stops.

27. The system of claim 26, wherein the first and the second pre-authorized stops are for tax purposes.

28. The system of claim 26, further comprising means for selecting valid and invalid legs of the route for tax purposes.

29. The system of claim 28, further comprising means for computing a total pre-authorized distance for the route.

30. The system of claim 29, wherein the pre-authorized distance is for tax purposes.

31. The system of claim 29 further comprising means for inputting and calculating inventory data related to the route.

32. The system of claim 31 further comprising means for comparing inventory data between a first and a second vehicle.

33. The system of claim 29 further comprising means for reporting data showing a time of stops versus a time of transit.

34. The system of claim 29 further comprising means for reporting stops designated as customers.

35. The system of claim 29 further comprising means for collecting an employee identity.

36. The system of claim 29 further comprising the step of collecting a vehicle identity.

37. The system of claim 29 further comprising means for collecting data from a plurality of vehicles.

38. The system of claim 29 further comprising means for presenting a graphical depiction of the route superimposed on a map.

39. The system of claim 29 further comprising:
a. means for monitoring and storing a route in incremental time segments;
b. means for calculating a vehicle speed for each time segment;
c. means for coding a range of speeds; and
d. means for displaying a graphic depiction of a speed history using the coding.

40. The system of claim 39 further comprising means for using colors as the coding and displaying a colored route history where changing colors represents changing speeds.

41. The system of claim 29 further comprising means for using a time originating from the vehicle location subsystem to record employee time worked data.

42. A system for monitoring data for a plurality of fleet mobile vehicles, the system comprising:
   a. means for providing an on-board mobile vehicle location sensor and data communication module functioning to transmit or receive data, wherein the module has an on-board unique identifier;
   b. means for providing a first base unit having a unique identifier and having a data communication module functioning to receive data from the mobile vehicle data communication module and send data to a super router, and the first base unit having a registry of mobile vehicles assigned to itself;
   c. means for providing a second base unit having a unique identifier and having a data communication module functioning to receive data from a mobile vehicle assigned to it and send data to the super router;
   d. means for providing the super router functioning to maintain data regarding the system with a program to store and compare a plurality of base unit identifiers and a relationship of mobile vehicle identifiers assigned to each base unit; and
   e. means for providing an algorithm in the super router functioning to permit a mobile vehicle to execute a roam from the first to the second base unit, the algorithm providing a storage of data relative to the roam in the super router.

43. A method for monitoring a fleet of mobile vehicles, wherein each mobile vehicle has an electronic system used to track a location of the mobile vehicle, the method comprising the steps of:
   a. providing an on-board mobile vehicle location sensor and data communication module, wherein the module has an on-board unique identifier;
   b. providing a first base unit having a unique identifier and having a data communication module to receive data from the mobile vehicle data communication module and send data to a super router, and the first base unit having a registry of mobile vehicles assigned to itself;
   c. providing a second base unit having a unique identifier and having a data communication module to receive data from a mobile vehicle assigned to it and send data to the super router;
   d. providing the super router with a program to store and compare a plurality of base unit identifiers and a relationship of mobile vehicle identifiers assigned to each base unit;
   e. providing an algorithm in the super router to permit a mobile vehicle to execute a roam from the first to the second base unit, the algorithm providing a storage of data relative to the roam in the super router; and
   f. providing integrated software to allow an end user to generate data reports as specified by the end user.

* * * * *

UNITED STATES PATENT AND TRADEMARK OFFICE
CERTIFICATE OF CORRECTION

PATENT NO. : 6,718,263 B1
DATED : April 6, 2004
INVENTOR(S) : Glass et al.

Page 1 of 1

It is certified that error appears in the above-identified patent and that said Letters Patent is hereby corrected as shown below:

Column 19,
Lines 49 to 53, delete "In the example shown in FIG. 8, it can be seen that the driver was travelling 81-85 mph (804 representing GREEN), then sped up to 86-90 mph (805 representing BLUE), back down to 81-85 mph (806 representing GREEN) and down to 76-80 mph (807 representing YELLOW).".
Line 56, "against driver Janet" should read -- against the driver --.

Signed and Sealed this

Thirteenth Day of June, 2006

JON W. DUDAS
*Director of the United States Patent and Trademark Office*